(12) United States Patent
Issac

(10) Patent No.: US 11,014,123 B2
(45) Date of Patent: May 25, 2021

(54) METHODS, SYSTEMS, AND APPARATUSES FOR MONITORING AND IMPROVING PRODUCTIVITY OF A MATERIAL HANDLING ENVIRONMENT

(71) Applicant: Hand Held Products, Inc., Skaneateles Falls, NY (US)

(72) Inventor: Praveen Issac, Charlotte, NC (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 305 days.

(21) Appl. No.: 15/991,408

(22) Filed: May 29, 2018

(65) Prior Publication Data
US 2019/0370721 A1 Dec. 5, 2019

(51) Int. Cl.
| | |
|---|---|
| B07C 3/00 | (2006.01) |
| B07C 3/02 | (2006.01) |
| G06Q 10/06 | (2012.01) |
| G06Q 10/08 | (2012.01) |
| G06T 7/70 | (2017.01) |
| G06T 7/62 | (2017.01) |
| B65G 33/02 | (2006.01) |
| G05B 19/042 | (2006.01) |

(Continued)

(52) U.S. Cl.
CPC .................. *B07C 3/02* (2013.01); *B07C 5/36* (2013.01); *B65G 15/06* (2013.01); *B65G 33/02* (2013.01); *G05B 13/028* (2013.01); *G05B 19/0426* (2013.01); *G06Q 10/0633* (2013.01); *G06Q 10/06398* (2013.01); *G06Q 10/0875* (2013.01); *G06T 7/62* (2017.01); *G06T 7/70* (2017.01); *G06Q 10/083* (2013.01); *G06T 2207/10028* (2013.01); *G06T 2207/10052* (2013.01)

(58) Field of Classification Search
None
See application file for complete search history.

(56) References Cited

U.S. PATENT DOCUMENTS

| | | | | |
|---|---|---|---|---|
| 5,737,494 A | * | 4/1998 | Guinta | G06Q 10/06 706/47 |
| 6,671,818 B1 | * | 12/2003 | Mikurak | G06Q 10/06 714/4.21 |

(Continued)

FOREIGN PATENT DOCUMENTS

CN 107462152 A 12/2017

*Primary Examiner* — Gurkanwaljit Singh
(74) *Attorney, Agent, or Firm* — Alston & Bird LLP

(57) ABSTRACT

Various embodiments described herein relates to techniques for providing real-time productivity information to a worker in a material handling environment. In this regard, for computing a productivity metric of the worker, a productivity metrics system may access various types of data. In this aspect, the productivity metric system may receive: order level data associated with multiple items identified for shipping; worker operation data associated with the workers and at least one workflow being operated by the workers; and dimensional data of the items being handled by the workers. The productivity metric system may compute the productivity metrics of the worker based on: the order level data, the dimensional data, the worker operation data, and a count of items handled by the worker. Further, the productivity metrics system may provide notifications including actionable insights indicative of actions to be performed by the worker.

20 Claims, 8 Drawing Sheets

(51) Int. Cl.
*B65G 15/06* (2006.01)
*B07C 5/36* (2006.01)
*G05B 13/02* (2006.01)

(56) References Cited

U.S. PATENT DOCUMENTS

| | | | | |
|---|---|---|---|---|
| 6,738,815 | B1* | 5/2004 | Willis, Jr. | H04L 69/08 |
| | | | | 709/219 |
| 6,744,436 | B1* | 6/2004 | Chirieleison, Jr. | G06Q 10/087 |
| | | | | 345/419 |
| 7,289,964 | B1* | 10/2007 | Bowman-Amuah | ............... |
| | | | | G06F 9/5038 |
| | | | | 705/1.1 |
| 7,992,686 | B2 | 8/2011 | Mccabe | |
| 8,266,066 | B1* | 9/2012 | Wezter | G06Q 10/06 |
| | | | | 705/78 |
| 8,457,781 | B2* | 6/2013 | Bailey | G06Q 50/28 |
| | | | | 700/224 |
| 8,655,705 | B2* | 2/2014 | Riepshoff | G06Q 10/06316 |
| | | | | 705/7.26 |
| 8,781,882 | B1* | 7/2014 | Arboletti | G06Q 10/0639 |
| | | | | 705/7.39 |
| 9,723,248 | B1* | 8/2017 | Colburn | G06F 3/017 |
| 9,795,997 | B2* | 10/2017 | Dearing | B07C 7/005 |
| 2003/0167199 | A1* | 9/2003 | Thomann | G06Q 10/10 |
| | | | | 705/35 |
| 2006/0206246 | A1* | 9/2006 | Walker | G06Q 10/00 |
| | | | | 701/16 |
| 2011/0046775 | A1* | 2/2011 | Bailey | B07C 3/02 |
| | | | | 700/224 |
| 2012/0065944 | A1* | 3/2012 | Nielsen | G06Q 10/103 |
| | | | | 703/1 |
| 2012/0089432 | A1* | 4/2012 | Podgurny | G06Q 10/06311 |
| | | | | 705/7.13 |
| 2012/0089493 | A1* | 4/2012 | Podgurny | G06Q 10/06 |
| | | | | 705/32 |
| 2013/0030873 | A1* | 1/2013 | Davidson | H04W 4/021 |
| | | | | 705/7.36 |
| 2014/0104416 | A1 | 4/2014 | Giordano et al. | |
| 2014/0222521 | A1* | 8/2014 | Chait | G06Q 10/0637 |
| | | | | 705/7.36 |
| 2014/0270356 | A1* | 9/2014 | Dearing | B07C 7/005 |
| | | | | 382/103 |
| 2014/0278828 | A1 | 9/2014 | Dorcas | |
| 2014/0329210 | A1* | 11/2014 | Masood | G09B 7/02 |
| | | | | 434/219 |
| 2014/0344116 | A1* | 11/2014 | Paracha | G06Q 10/087 |
| | | | | 705/28 |
| 2015/0199641 | A1* | 7/2015 | Napoli | G06Q 10/06311 |
| | | | | 705/7.15 |
| 2015/0294251 | A1* | 10/2015 | Hildmann | G06Q 10/06311 |
| | | | | 705/7.13 |
| 2016/0109219 | A1 | 4/2016 | Ackley et al. | |
| 2016/0109220 | A1 | 4/2016 | Laffargue et al. | |
| 2016/0112631 | A1 | 4/2016 | Ackley et al. | |
| 2016/0112643 | A1 | 4/2016 | Laffargue et al. | |
| 2016/0343176 | A1 | 11/2016 | Ackley | |
| 2016/0370220 | A1 | 12/2016 | Ackley | |
| 2017/0010141 | A1 | 1/2017 | Ackley | |
| 2017/0053326 | A1 | 2/2017 | Sivasankarannair et al. | |
| 2017/0091706 | A1 | 3/2017 | Lloyd et al. | |
| 2017/0230639 | A1 | 8/2017 | Laffargue et al. | |
| 2017/0304872 | A1* | 10/2017 | Dearing | B07C 7/005 |
| 2017/0351891 | A1 | 12/2017 | Ackley et al. | |
| 2017/0358098 | A1 | 12/2017 | Lloyd et al. | |
| 2017/0365060 | A1 | 12/2017 | Ackley | |
| 2018/0033214 | A1 | 2/2018 | Ackley | |
| 2018/0052027 | A1 | 2/2018 | Ackley | |
| 2018/0106596 | A1 | 4/2018 | Ackley et al. | |
| 2018/0224837 | A1* | 8/2018 | Enssle | G05B 19/4189 |

* cited by examiner

METHODS, SYSTEMS, AND APPARATUSES FOR MONITORING AND IMPROVING PRODUCTIVITY OF A MATERIAL HANDLING ENVIRONMENT

TECHNOLOGICAL FIELD

Exemplary embodiments of the present disclosure relate generally to resource management in a material handling environment and, more particularly, to methods, systems, and apparatuses that monitors and improves productivity of resources in the material handling environment.

BACKGROUND

Generally, in material handling environments including, but not limited to, warehouses, inventories, distribution and shipping centers etc., measuring dimensions of a package that is intended for shipping is often required. For example, in such environments, cost to ship the package needs to be computed based on dimensions of the packages. Also, while handling multiple packages for shipping, dimension measurement for these packages are often to be considered for planning and resource management for both machines and manpower. Typically, in such material handling industries, shipping companies charge customers for their services based on a package size (i.e., volumetric weight) and/or weight (i.e., dead weight) of packages in a customer order. Dimensions of these packages are measured manually by workers operating in that environment. For instance, in manual handling, freight carrier employees derive this information through hand measurements (e.g., with a tape measure) and by weighing each package on a scale. In this aspect, hand measurements are prone to error, particularly when packages have irregular shapes, and often, these errors lead to financial losses as additional costs are attributed due to incorrect dimensioning.

Dimensioning objects, parcels, and pallets, shipping companies and warehouses can make optimal use of space and charge for services accordingly. Therefore, dimensioning systems that provide dimensional information of packages without causing a disruption in ongoing workflows within material handling environments are often in demand. As these systems become increasingly part of commercial processes, their accuracy becomes a key characteristic to understand. Thus, operations within the material handling environments, including packaging and processing packages for shipping is challenging and requires managing resources i.e. including both machinery and workers, within such environments in an accurate manner to run effective operations and generate profits.

Applicant has identified a number of deficiencies and problems associated with conventional methods of managing operations and resources in material handling environments. Through applied effort, ingenuity, and innovation, many of these identified problems have been solved by developing solutions that are included in embodiments of the present disclosure, many examples of which are described in detail herein.

BRIEF SUMMARY

Various embodiments illustrated herein disclose techniques for providing real-time productivity information of a worker in a material handling environment. In an embodiment, a method for providing the real-time productivity information includes accessing, order level data associated with multiple items which are identified for shipping in the material handling environment. In this regard, as the multiple items are being processed for shipping, the method includes, receiving, in real-time, dimensional data indicative of dimensions of at least one item from the multiple items. In an aspect, the dimensional data may be determined based on processing one or more range images of the at least one item when the item is placed in a field of view of a dimensioning system. The method also includes accessing, worker operation data, indicative of information associated with the worker and at least one workflow that is being operated by the worker. In accordance with the various embodiments described herein, the method includes computing a productivity metric of the worker based on the order level data, the dimensional data, the worker operation data, and a count of the at least one item. The method further includes providing notifications including actionable insights indicative of actions to be performed by the worker based on the computed productivity metric of the worker.

According to an embodiment, dimensional data used for computing the productivity metric of the worker is determined based on capturing multiple range images of the at least one item by a range imaging unit of the dimensioning system. In this regard, the range images may be captured upon detecting a light pattern which is reflected from the at least one item, when the light pattern is projected on the at least one item, by a pattern projecting unit of the dimensioning system. In an aspect, the light pattern is projected on the at least one item when the at least one item is placed in the field of view of the dimensioning system. In accordance with said embodiment, the dimensional data here may correspond to at least one of volume, dimensional weight, height, and width of the at least one item.

In accordance with various embodiments described herein, a method for computing the productivity metric includes, computing dimensional throughput data which is indicative of a delivery throughput of the material handling environment with respect to dimensions of the multiple items that are being processed for shipping in the material handling environment. In this regard, the dimensional throughput data is computed based on the dimensional data, including a volumetric dimension of the at least one item and the worker operation data including a use case data associated with the at least one workflow which is being operated by the worker. Further, in an aspect, computing the productivity data also includes computing order throughput data which is indicative of a delivery throughput of the material handling environment per one shipping order. In this regard, the order throughput data is computed based on the count of the at least one item identified for the shipping and the worker operation data including the use-case data associated with the workflow which is being operated by the worker. According to the said embodiment, the productivity metric is computed thereafter, based on a weighted average of the computed dimensional throughput data and the computed order throughput data.

In accordance with various example embodiments described herein, the order level data includes specifications of a customer order identified for shipping including the multiple items and association of the at least one item from amongst the multiple items with the customer order.

According to an embodiment, the method of providing real-time productivity of the worker also includes, providing the notifications including actionable insights to the workers in the material handling environment. In this regard, the notifications are indicative of instructions for positioning the at least one item, in a pre-defined orientation, in the field of view of the dimensioning system. In this regard, the predefined orientation is based on protocols to be followed by the worker for positioning the at least one item in the field of view of the dimensioning system. Illustratively, according to various embodiments, the protocols for positioning the at least one item in the field of view of the dimensioning system may include at least one of: positioning the at least one item at a center of the field of view of the dimensioning system; positioning the at least one item with a surface of the at least one item having the largest surface area facing a scale of the dimensioning system; positioning the at least one item with a surface on which labels are affixed facing towards the dimensioning system; positioning each item from amongst the multiple items with a pre-defined gap when positioned in the field of view of the dimensioning system; positioning items having cylindrical shape from amongst the multiple items in a horizontal orientation with respect to a platform on which the items are positioned in the field of view of the dimensioning system.

According to some example implementations of embodiments described herein, the notifications are provided based on identification of errors recorded by the dimensioning system in computing the dimensional data of the at least one item. In this regard, the errors are identified based on detecting a presence of non-adherence with the protocols to be followed by the worker for positioning the at least one item in the field of view of the dimensioning system.

According to various embodiments described herein, the worker operation data associated with the worker may include at least one of a duration of employment for a worker, designation indicative of a role and responsibility of the worker in a material handling environment.

In an embodiment, a method for providing the notifications is described herein. In an aspect, the method includes receiving range images and point cloud data from the dimensioning system for items handled by multiple workers in a material handling environment. Upon receiving the range images and the point cloud data product orientation indicative of placements of the items in the field of view of the dimensioning system is determined for each item handled by the multiple workers. The method further includes identifying workers from amongst multiple workers having a pre-defined productivity metric and selecting product orientation for those items which are being handled by the identified workers. The method then includes providing notifications including instructions for placing the items in the selected product orientations.

According to another embodiment, a system for providing real-time productivity information to a worker in a material handling environment, is described herein. The system includes a dimensioning unit including a pattern projecting unit and a range imaging unit. In this regard, the pattern projecting unit is configured to project a light pattern on an item placed in field of view of the dimensioning unit and the range imaging unit is configured to capture one or more range images of the item on receiving the light pattern which is reflected from the item upon projection of the light pattern on the item. In an aspect, the dimensioning system also includes a processor communicatively coupled to the pattern projecting unit and the range imaging unit, to control various operations performed by the pattern projecting unit and the range imaging unit respectively. In this regard, the processor is configured for computing dimensional data indicative of the dimensions of the items based on the processing of the range images. The system further includes a processing unit communicatively coupled to the dimensioning unit and a warehouse management system. In an aspect, the processing unit is adapted to access order level data associated with multiple items identified for shipping and dimensional data. In this regard, to compute the productivity metric, the processing unit accesses the order level data from the warehouse management system and the dimensional data from the dimensioning unit. Further, the processing unit is adapted to receive, in real-time, as the item from amongst the plurality of items is being processed for shipping, the dimensional data from the dimensioning unit. The processing unit is further adapted to access worker operation data indicative of information associated with the worker and at least one workflow being operated by the worker. In this aspect, based on the order level data, the dimensional data, the worker operation data, and a count of items handled by the worker, the processing unit is adapted to compute productivity metrics of the worker. In an aspect, the processing unit is also adapted to provide notifications comprising actionable insights indicative of actions to be performed by the worker for improving the computed productivity metric.

According to an embodiment, an apparatus for providing real-time productivity information to a worker in a material handling environment is described. In this regard, the apparatus includes at least one processor and at least one non-transitory memory including a program code. In an aspect, the at least one non-transitory memory and the program code are configured to, with the at least one processor, cause the apparatus to at least access order level data associated with plurality of items identified for shipping in the material handling environment. In this regard, the order level data may be accessed from a warehouse management system. Further, the at least one non-transitory memory and the program code are configured to, with the at least one processor, cause the apparatus to at least receive, in real-time as the item from amongst the plurality of items is being processed for shipping, dimensional data indicative of dimensions of the plurality of items that are being processed for shipping. Further, in an aspect, the at least one non-transitory memory and the program code are configured to, with the at least one processor, cause the apparatus to at least access, worker operation data indicative of information associated with the worker handling the shipping for the plurality of items and at least one workflow being operated by the worker. In an aspect, the at least one non-transitory memory and the program code are also configured to, with the at least one processor, cause the apparatus to at least compute the productivity metrics of the worker based on the order level data, the dimensional data, the worker operation data, and a count of the plurality of items handled by the worker.

According to some embodiments, a method for providing real-time productivity information to a worker in a material handling environment is provided. The method comprises accessing, by a processing unit, order level data associated with a plurality of items identified for shipping in the material handling environment from a warehouse management system; receiving, from a dimensioning system in real-time as at least one item from the plurality of items is being processed for shipping, dimensional data indicative of dimensions of the at least one item, wherein the dimensional data is determined based on processing a plurality of range images of the at least one item when the at least one item is placed in a field of view of the dimensioning system; accessing, by the processing unit, worker operation data indicative of information associated with the worker and at least one workflow being operated by the worker; computing, by the processing unit, productivity metrics of the worker based on: the order level data, the dimensional data, the worker operation data, and a count of the at least one item identified for shipping; and providing, by the processing unit, notifications comprising actionable insights indicative of actions to be performed by the worker based on the computed productivity metrics of the worker.

According to some embodiments, the dimensional data is determined based on: projecting, by a pattern projecting unit of the dimensioning system, light pattern on the at least one item placed in the field of view of the dimensioning system; and capturing, by a range imaging unit of the dimensioning system, the plurality of the range images of the at least one item upon detecting the light pattern reflected from the at least one item.

According to some embodiments, the dimensional data comprises at least one of: volume, dimensional weight, height, or width corresponding to the at least one item.

According to some embodiments, the computing of the productivity metrics comprises: computing dimensional throughput data based on: (a) the dimensional data including a volumetric dimension of the at least one item and (b) the worker operation data including a use-case data associated with the workflow being operated by the worker, wherein the dimensional throughput data is indicative of a delivery throughput of material handling environment with respect to dimensions of the plurality of items being processed for shipping in the material handling environment; computing order throughput data based on the count of the at least one item identified for the shipping and the worker operation data including the use-case data associated with the workflow being operated by the worker, wherein the order throughput data is indicative of a delivery throughput of the material handling environment per shipping order; and computing the productivity metrics based on a weighted average of the computed dimensional throughput data and the computed order throughput data.

According to some embodiments, the productivity metrics further comprises receiving, from the warehouse management system, inputs indicative of weight for at least one of: the order level data, dimensional data, or the worker operation data.

According to some embodiments, the count of the at least one item is determined based on at least one of: scanning, by an encoded information reader, coded information on the at least one item, or detecting by the dimensioning system, placement of the at least one item in the field of view of the dimensioning system.

According to some embodiments, the order level data comprising specifications of a customer order identified for the shipping and an association of the at least one item from the plurality of items with the customer order.

According to some embodiments, notifications are indicative of instructions for positioning the at least one item in a pre-defined orientation, in the field of view of the dimensioning system, wherein the pre-defined orientation is based on protocols to be followed by the worker for positioning the at least one item in the field of view of the dimensioning system.

According to some embodiments, the protocols for positioning the at least one item to be dimensioned in the field of view of the dimensioning system comprises at least one of: (i) positioning the at least one item at a center of the field of view of the dimensioning system, (ii) positioning the at least one item in the field of view of the dimensioning system with a surface having largest surface area facing a scale of the dimensioning system, (iii) positioning the at least one item with a surface on which labels are affixed facing towards the dimensioning system, (iv) positioning each item from amongst the plurality of items with a pre-defined gap when each of the item is positioned in the field of view of the dimensioning system, or (v) positioning at least one item having cylindrical shape from amongst the plurality of items in a horizontal orientation with respect to a platform on which the at least one item is positioned in the field of view of the dimensioning system.

According to some embodiments, the processing unit is to provide the notifications based on identifying errors recorded by the dimensioning system in computing the dimensional data of the at least one item, wherein the errors are recorded by the dimensioning system by detecting presence of non-adherence with the protocols to be followed by the worker for positioning the at least one item in the field of view of the dimensioning system.

According to some embodiments, the notifications are provided based on: receiving, by the processing unit, range images and point cloud data from the dimensioning system for items handled by plurality of workers operating in the material handling environment; computing product orientation, indicative of placement of the items in the field of view of the dimensioning system, based on processing the received range images and point cloud data, wherein the product orientation is computed for each item being handled by the plurality of workers; identifying workers from the plurality of workers having a pre-defined productivity metric; selecting product orientation corresponding to items handled by the identified workers; and providing notifications including instructions for placing the items in the selected product orientations.

According to some embodiments, worker operation data associated with the worker comprises at least one of a duration of employment for the worker, or a designation indicative of a role and responsibility of the worker in the material handling environment.

According to some embodiments, the worker operation data associated with the workflow being operated by the worker corresponds to rules comprising one or more of: rules for packaging items based on at least one of an item type, a customer, irregularity in dimensions of the items, rules for creation of labels to be affixed on the items, and rules for packing multiple stock keeping units into one over-pack based on the dimensional data for the items.

According to some embodiments, the actionable insights comprises instructions for at least one of positioning a weighing scale in the field of view of the dimensioning system, affixing labels on the plurality of items, or positioning an item from amongst the plurality of items in the field of view of the dimensioning system.

According to some embodiments, a system for providing real-time productivity information to a worker in a material handling environment, the system comprising: a dimensioning system comprising: a pattern projecting unit configured to project a light pattern on an item placed in a field of view of the dimensioning system; a range imaging unit configured to capture one or more range images of the item on receiving the light pattern reflected from the item upon projection of the light pattern on the item; a processor, communicatively coupled to the pattern projecting unit and the range imaging unit, wherein the processor is configured to compute dimensional data indicative of dimensions of the item based on processing of the range images; a processing unit communicatively coupled to the dimensioning system and a warehouse management system, wherein the processing unit is configured to: access, from the warehouse management system, order level data associated with plurality of items identified for shipping in the material handling environment; receive, in real-time as the item from amongst the plurality of items is being processed for shipping, the dimensional data from the dimensioning system; access worker operation data indicative of information associated with the worker and at least one workflow being operated by the worker; computing productivity metrics of the worker based on: the order level data, the dimensional data, the worker operation data, and a count of items handled by the worker; and providing notifications comprising actionable insights indicative of actions to be performed by the worker for improving the computed productivity metrics.

According to some embodiments, to compute the productivity metrics, the processing unit is to further: compute dimensional throughput data based on: (a) the dimensional data including a volumetric dimension of at least one item from the plurality of items and (b) the worker operation data including a use-case data associated with the workflow being operated by the worker, wherein the dimensional throughput data is indicative of a delivery throughput of material handling environment with respect to dimensions of the plurality of items being processed for shipping in the material handling environment; compute order throughput data based on the at least one item identified for the shipping and the worker operation data including the use-case data associated with the workflow being operated by the worker, wherein the order throughput data is indicative of a delivery throughput of the material handling environment per shipping order; and compute the productivity metrics based on a weighted average of the computed dimensional throughput data and the computed order throughput data.

According to some embodiments, to provide the notifications, the processing unit is configured to further: receive range images and point cloud data from the dimensioning system for items handled by plurality of workers operating in the material handling environment; compute product orientation, indicative of placement of the items in the field of view of the dimensioning system, based on processing the received range images and point cloud data, wherein the product orientation is computed for each item being handled by the plurality of workers; identify workers from amongst the plurality of workers having a pre-defined productivity metric; select product orientation corresponding to items handled by the identified workers; and provide notifications including instructions for placing the items in the selected product orientations.

According to some embodiments, the notifications are indicative of instructions for positioning the at least one item in a pre-defined orientation, in the field of view of the dimensioning system, wherein the pre-defined orientation is based on protocols to be followed by the worker for positioning the at least one item in the field of view of the dimensioning system.

According to some embodiments, the worker operation data associated with the worker comprises at least one of a duration of employment for the worker, or a designation indicative of a role and responsibility of the worker in the material handling environment.

According to some embodiments, an apparatus for providing real-time productivity information to a worker in a material handling environment is provided. The apparatus comprising at least one processor and at least one non-transitory memory including program code, the at least one non-transitory memory and the program code configured to, with the at least one processor, cause the apparatus to at least: access, from a warehouse management system, order level data associated with plurality of items identified for shipping in the material handling environment; receiving, in real-time as an item from the plurality of items is being processed for shipping, dimensional data indicative of dimensions of the plurality of items that are being processed for shipping; access worker operation data indicative of information associated with the worker handling the shipping for the plurality of items and at least one workflow being operated by the worker; and computing productivity metrics of the worker based on: the order level data, the dimensional data, the worker operation data, and a count of the plurality of items handled by the worker.

The above summary is provided merely for purposes of providing an overview of one or more exemplary embodiments described herein so as to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained within the following detailed description and its accompanying drawings.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
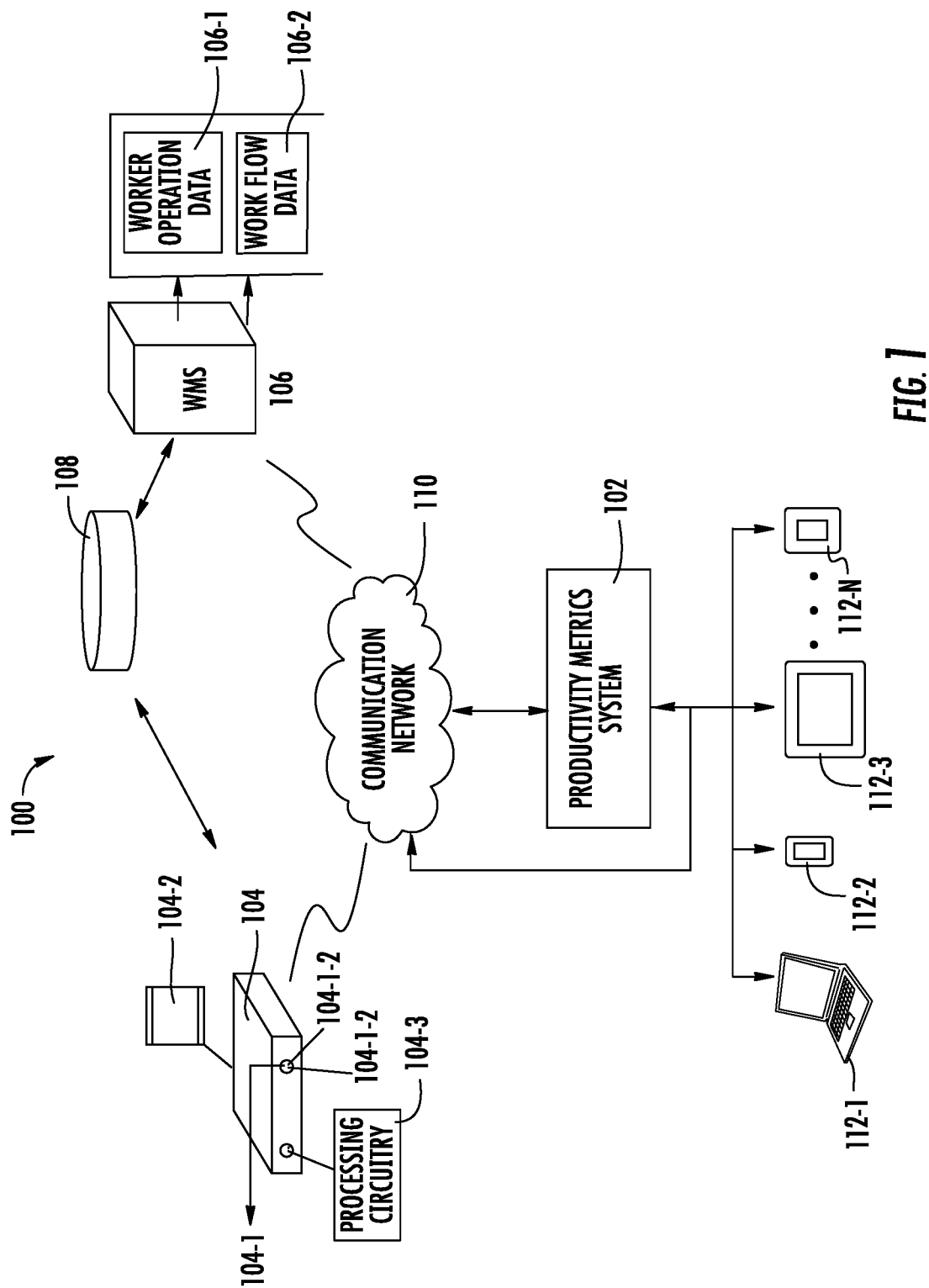
FIG. 1 illustrates an exemplary material handling environment comprising a system for providing real-time productivity information of a worker, in accordance with some example embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "material handling environments" refers to environments related to, but not limited to, manufacturing of the items, inventory storage of the items, packaging and unpackaging of the items, preparing customer orders, recording items related information based on scanning and identification of the items, and shipment processing (including shipping and logistics distribution of the items). In such environments, many workers perform different operations, which involve handling of items during various phases (including, but not limited to, accumulation, sortation, scanning and identification, packaging and shipment preparation etc.), of overall operation cycle of the material handling environment. For example, workers are involved in manual packaging and unpackaging of the items while preparing customer orders for shipping. In another example, workers may handle placing the items in an accumulation zone of a conveyor system for automated packaging of the items. In some environments, workers use electronic devices like personal digital assistants (PDAs) or mobile devices, connected to a headset and a server, to receiving automated or voice directed instructions for performing various operations including scanning and identification of labels, such as barcodes, RFID tags, etc. affixed on the items for shipment preparation. Thus, in these environments, many workers are usually involved in performing day to day operations involving handling items and performing operations including interaction with different machines, such as an accumulator, a dimensioner, a scanning and identification device, etc., for shipment processing and transportation.

It may also be understood that material handling environments described herein may refer to an environment having various equipment, including, for instance, any of machines like conveyor belt units, sorters, palletizers, and other scanning and identification based equipment's (including, but not limited to, barcode scanners, RFID readers, and bi-optic scanners) for tracking and tracing items as the items are processed while preparing customer orders for shipping. Many such devices are interconnected in terms of operations, such that both operations and performance of one device and a worker involved in handling operations with that device impact the operations of another devices existent in the environment. For example, if a worker is not performing scanning and identification of labels on items at usual speed (for instance, 5 cartons per minute) in an identification zone of a conveyor, a delay in item identification would cause delay in operations of other devices, such as palletizers or downstream conveyors for preparing and transporting the orders for shipping, thereby causing ineffective utilizing and execution of these devices. This often reduces an overall productivity of the material handling environment in terms of various operational performance factors including, but not limited to, turnaround time for a shipment processing cycle, a back-order rate indicative of a measurement of how many shipping orders cannot be filled at a time a customer places the shipping orders, cost per line for items shipped, an on time shipping rate, truck time at a dock, a fill rate indicative of a measure of the depth of demand that was satisfied by inventory on hand, and time from receiving to pick location etc. and therefore impacts operational efficiency of systems installed in the material handling environments.

An accurate determination of productivity of the workers in real-time is useful and affects overall operation of the material handling environments. In this regard, consideration of dimensions of items being handled by the workers in their day-to-day handling of items during various operations plays a vital role in estimating productivity of the workers. For instance, productivity estimation for workers handling shipments or customer orders including items which are dimensionally big is generally calculated differently than productivity estimation for workers who are processing shipments including small consumable items. For example, workstations involving shipment processing for items which are fragile, heavy, dimensionally large, requires careful handling, and productivity estimation of such workers is to be calculated in a manner different than calculating productivity estimation of workers in workstations where items for shipping are of usual size. Accordingly, estimating productivity of the workers without giving a due consideration to dimensional data of the items is error-prone and provides inaccurate statistics of overall health of operations of the material handling environment. Further, in some systems, manual dimensioning of items is performed by the workers at such shipping centers. In some systems, dimensioners are used for automated dimensioning of items, which require correctly placing the items in a field of view of the dimensioner. However, it may be noted that manual dimensioning is error-prone and automated dimensioners lacks a capability to give real-time feedback to workers about whether they are positioning the items for dimensioning in a correct way or not. In this context, particularly for material handling environments involved in large scale shipment processing having high delivery throughputs (i.e. where such large-scale processing of different types of items is performed on a daily basis (for example, preparing 2000 items per hour for shipping)), and which also require different procedures and rules of handling and positioning of different types of items, even a small error in either dimensioning of the items and/or productivity estimation of workers largely impacts overall operation cycle, throughput, and turn-around time of the material handling environments. This subsequently impacts planning and estimation of resources within the material handling environments.

Various embodiments described herein relates to a system for providing, in real-time, productivity information of workers working in a material handling environment. In this regard, along with the productivity information, notifications including actionable insights, are provided on electronic devices used by the workers. The actionable insights are such that those insights may be directly used by the workers, on the go, i.e. while performing various operations, for improving the productivity of the workers in the material handling system. In this regard, the actionable insights include instructions which, on execution, not only improves the productivity of the workers, but also improves operational efficiency of various devices, for instance, a dimensioner, operating within the material handling system.

In accordance with various embodiments described herein, a productivity metrics system provides productivity metric information and notifications including the actionable insights to the workers. In this regard, in an operation, dimensional data of the items being handled by the workers is received in real-time at the productivity metric system, and considered by the productivity metric system for computing productivity of the workers. Illustratively, the dimensional data including dimensions of items (which are being handled by the workers) are accessed in real time while the item is being processed (for instance, during shipment processing in a shipping center). Also, in operation, the productivity metric system also accesses "order level data" including data pertaining to customer order and specifications related to items in the customer order and "worker operation data" including data related to worker profile and use-cases or workflows being handled by the worker in the material handling environment. Based on accessing the dimensional data, the order level data, the worker's operation data, and a count of items being handled by the workers, the productivity metric system provides a productivity metric indicative of a productivity of each worker and notifications including actionable insights as a feedback for improving the productivity of the workers.

Because computation and provisioning of the productivity metrics of a worker is dynamic and being provided in real-time, overall performance of workers can be monitored in real-time by an administrator, such as a monitoring server or a warehouse manager. Also, based on the computed productivity metrics of the workers, operational efficiency of various machines, in terms of various operational performance factors including, but not limited to, turnaround time for a shipment processing cycle, a back-order rate indicative of a measurement of how many shipping orders cannot be filled at a time a customer places the shipping orders, cost per line for items shipped, an on time shipping rate, truck time at a dock, a fill rate indicative of a measure of the depth of demand that was satisfied by inventory on hand, and time from receiving to pick location, a delivery throughput, etc., can be monitored in real-time when these machines are processing and handling various items in the material handling environment. Further, productivity, management, and handling of such machines can be improved based on the productivity metrics and the notifications in form of actionable insights provided on the devices, including but not limited to handheld devices or various controllers, such as programmable logic controllers (PLCs) installed within the material handling environment for controlling operations of various machines.

Having described example embodiments at a high level, the design of the various devices performing various example operations is provided below.

FIG. 1 illustrates an exemplary material handling environment 100 (which can be, for example, but not limited to, a warehouse, a distribution center, an inventory, or a shipping center) comprising a productivity metrics system 102 for providing real-time productivity information of a worker in the material handling environment 100. According to an embodiment, the material handling environment 100 may include a dimensioning system 104, a warehouse management system 106, and a global reference database 108, in communication to the productivity metric system 102 over a communication network 110. In this aspect, the productivity metric system 102 may be in communication to plurality of computing nodes 112-1, 112-2, . . . 112-N, over the communication network 110 and/or through other alternative networks available in the material handling environment 100. In accordance with various example embodiments described herein, the productivity metric system 102 may receive various data over the communication network 110 (for instance, "dimensional data" corresponding to dimensional information of items being handled by multiple workers in the material handling environment, "order level data" associated with such items, and "worker operation data" associated with the workers) to compute productivity metrics of the workers operating in the material handling environment 100. In this regard, in an embodiment, the productivity metric system 102 may receive the dimensional data, the order level data and the worker's operation data based on communication via the communication network 110 with any of the dimensioning system 104, the warehouse management system 106, and/or the computing nodes 112-1, 112-2 . . . 112-N, respectively.

In accordance with various embodiments described herein, the productivity metric system 102 may comprise distributed components either physically distributed and/or functionally distributed, or alternatively could be implemented as a collective element. In this regard, illustratively, in one embodiment, the productivity metric system 102 may correspond to a distributed computing system comprising a set of computing devices (for instance, but not limited to multiple servers) coordinating with each other to perform a task in a distributed fashion. For instance, in an embodiment, the productivity metric system 102 may correspond to a cloud based service provided by set of distributed computing devices, for example, but not limited, to one of an infrastructure as service (IAAS), platform as service (PAAS), and/or software as service (SAAS). Alternatively, in another embodiment, the productivity metric system 102 may correspond to a single server, such as a standalone server unit or may be one amongst the plurality of computing nodes 112-1, 112-2 . . . 112-N where the productivity metric system 102 is provided as a service by any means of the aforementioned, cloud based services.

In accordance with various embodiments described herein, one or more of these computing nodes 112-1, 112-2, . . . 112-N may be used by different workers in the material handling environment 100 to perform various tasks and to receive, in real-time, productivity information from the productivity metric system 102. In this aspect, the computing nodes 112-1, 112-2 . . . 112-N, may correspond to, but not limited to, portable devices including, notebook computers, laptop computers, handheld computers, palmtop computers, mobile phones, cell phones, smart phones, PDAs, headset devices, etc., which may be used by various workers in a material handling environment 100, for instance, a distribution center, a warehouse, a shipping center, or an inventory. Illustratively, in accordance with various embodiments described herein, various workflows in form of voice directed or graphical user interface (GUI) based tasks may be executed on in a sequenced order on one or more of these computing nodes 112-1, 112-2 . . . 112-N. In this aspect, the workers may provide responses in form of either audible replies/voice based responses on a microphone unit or inputs on an input interface of a display unit associated with the respective computing nodes 112-1, 112-2 . . . 112-N.

In accordance with various embodiments described herein, the dimensioning system 104 may include a dimensioner unit 104-1 and a dimensioning database 104-2. In this regard, the dimensioner unit 104-1 may include a pattern projecting unit 104-1-1 adapted to project a light pattern in a field of view of the dimensioner unit 104-1 and a range imaging unit 104-1-2 adapted to capture images of items placed in the field of view of the dimensioner unit 104-1. In one embodiment, the dimensioning system 104 may also include a processing circuitry 104-3 adapted to access the images captured by the range imaging unit 104-1-2 of the dimensioner unit 104-1 and process the images to compute dimensions of the items.

In accordance with various embodiments described herein, the warehouse management system 106 may correspond to a server connected to a database system, such as, but not limited to, an enterprise server, a customer relationship management database (such as SAP, etc.) which may store information about various workers working in the material handling environment 100. The warehouse management system 106 may also store information also about customers' orders from the material handling environment 100. In this aspect, a database of the warehouse management system 106 may store worker operation data 106-1 including various information about the workers, such as, but not limited to, a worker's name, demographic details, age, sex, birthdate, a duration of employment, designation indicative of a role and responsibility of the worker in an organization, and various other information associated with the worker.

Also, the database of the warehouse management system 106 may store workflow data 106-2 indicative of different workflows on which a worker is working in the material handling environment 100. In this regard, as discussed before, the workflows correspond to a series of tasks or steps to be performed by a worker in a defined sequence for completing various operations within the material handling environment 100. For example, a "pick-list" workflow may include instructions for picking various products in a customer order which are located at different locations within an inventory. Illustratively, in one situation, each of the computing nodes 112-1, 112-2 . . . 112-N may receive instructions from a server, in form of a series of computer generated tasks which are executed as steps of a workflow tasks on the computing nodes 112-1, 112-2 . . . 112-N. Illustratively, in some implementations, a series of automated steps may be in form of voice directed commands from server stating a location identifier, like aisle number, bin number, shelf number, along with a product identifier or a product name, that are received at a speaker or a headset associated with the computing nodes 112-1, 112-2 . . . 112-N. Similarly, in some example implementations, such series of automated steps may be simultaneously received from a server, in form of visual interfaces displayed on a display unit of the computing nodes 112-1, 112-2 . . . 112-N, to which the workers provide their responses, i.e. either voice based or GUI based, while performing such tasks. Accordingly, in this aspect, the database of the warehouse management system 106 may store workflow data indicative of different types of predefined workflows, for example, but not limited to, a pick list workflow, a stock to shelf workflow, a gap scan workflow, a shipment processing workflow, and so on. In an embodiment, the warehouse management system 106 may also include multiple remote servers or a stand-alone server associated with the global reference database 108. In this regard, the global reference database 108 may store global worker operation and performance data that may be accessed by the productivity metric system 102 along with the computed productivity metrics to provide various actionable insights to the workers on the respective computing nodes 112-1, 112-2 . . . 112-N used by the workers in field of operation.

Figure 2:
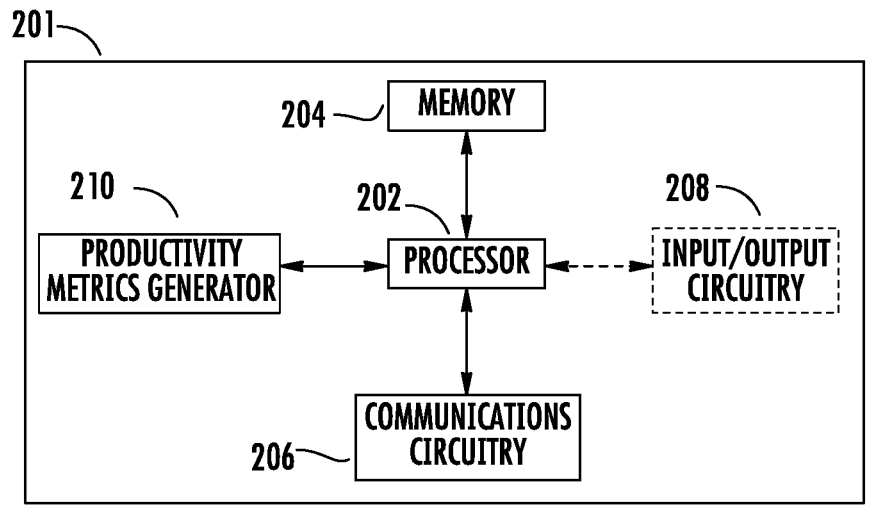
FIG. 2 illustrates an exemplary system for providing, in real-time, productivity information of a worker, in accordance with some example embodiments described herein.

Turning to FIG. 2, various components in a material handling environment including an exemplary apparatus 201 (also referred as productivity metrics system 201 interchangeably hereinafter throughout the description) for providing real-time productivity information of a worker is illustrated in accordance with some example embodiments described herein. In this aspect, an apparatus 201 is illustrated that may represent a basic set of components of a device embodying an example productivity metric system 102 illustrated in FIG. 1. The apparatus 201 may include a processor 202, a memory 204, and a communications circuitry 206. In some embodiments, the apparatus 201 may further include input/output circuitry 208 for interacting with other systems, such as the dimensioning system 104 and the warehouse management system 106 within the material handling environment 100 of FIG. 1. In an aspect, the apparatus 201 may also include a productivity metric generator 210 communicatively coupled to the processor 202. Illustratively, the apparatus 201 may be configured to execute the operations described below in connection with FIGS. 6-9. Although these components 202-210 are described with some functional descriptors, it may be understood that the particular implementations necessarily include the use of particular hardware. It may also be understood that certain of these components 202-210 may include similar or common hardware. For example, the apparatus 201 may leverage use of the processor 202, memory 204, communications circuitry 206, and/or input/output circuitry 208 to perform their associated functions, and duplicate hardware is not required for the distinct components of the apparatus 201 (although embodiments using duplicated hardware are also contemplated herein). The use of the term "circuitry" as used herein with respect to components of the apparatus therefore includes particular hardware configured to perform the functions associated with the particular circuitry described herein. Of course, while the term "circuitry" may be understood broadly to include hardware, in some embodiments, circuitry may also include software for configuring the hardware components of the apparatus 201.

In some embodiments, the processor 202 (and/or co-processor or any other processing circuitry assisting or otherwise associated with the processor) may be in communication with the memory 204 via a bus for passing information among components of the apparatus. The processor 202 may be embodied in a number of different ways and may, for example, include one or more processing devices configured to perform independently. Additionally, or alternatively, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor 202. Alternatively, or additionally, the processor 202 may be configured to execute hard-coded functionality. As such, whether configured by hardware or software methods, or by a combination of hardware with software, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

The memory 204 is non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 201. In this regard, the communications circuitry 206 may include, for example, a network interface for enabling communications with a wired or wireless communication network. For example, the communications circuitry 206 may include one or more network interface cards, antennae, buses, switches, routers, modems, and supporting hardware and/or software, or any other device suitable for enabling communications via a network. Additionally, or alternatively, the communications circuitry 206 may include the circuitry for interacting with the antenna(s) to cause transmission of signals via the antenna(s) or to handle receipt of signals received via the antenna(s). These signals may be transmitted by the apparatus 201 over a network, such as the communication network 110 of FIG. 1, using a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it may be understood that these signals may be transmitted using Wi-Fi, Near Field Communications (NFC), Worldwide Interoperability for Microwave Access (WiMAX), or other proximity-based communications protocols.

In some embodiments, the apparatus 201 may include input/output circuitry 208 that may, in turn, be in communication with processor 202 to provide output to a worker and, in some embodiments, to receive an indication of worker input. The input/output circuitry 208 may comprise a user interface and may include a display that may include a web user interface, a mobile application, a client device, or the like. In some embodiments, the input/output circuitry 208 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

In addition, the apparatus 201 also comprises the productivity metrics generator 210, which includes hardware components designed to compute productivity metrics of workers operating in the material handling environment and provide notifications indicative of actionable insights to the workers, including positioning items in a field of view of a dimensioning system, such as the dimensioning system 104 of FIG. 1. In an aspect, the productivity metrics generator 210 may utilize the processor 202, the memory 204, or other hardware component included in the apparatus 201 to perform these functions. The productivity metrics generator 210 may further utilize communications circuitry 206 to receive data from a variety of data sources.

It should be appreciated that, in some embodiments, the productivity metrics generator 210 may include a separate processor, specially configured field programmable gate array (FPGA), or application specific interface circuit (ASIC) to perform the above-described functions. The productivity metrics generator 210 is therefore implemented using hardware components of the apparatus configured by either hardware or software for implementing these planned functions.

As illustrated, the productivity metrics system 201 may be communicatively coupled to a dimensioning system via a communications network, such as the dimensioning system 104 of FIG. 1 including the pattern projecting unit 104-1-1 and the range imagining unit 104-1-2 via the communication network 110. The productivity metrics system 201 may also be communicatively coupled to a warehouse management system, such as the warehouse management system 106 of FIG. 1. In this regard, in accordance with various embodiments described herein, to perform various operations of the productivity metrics system 201, components including, but not limited to, the processor 202, the memory 204, the productivity metrics generator 210, the input/output circuitry 208, and the communications circuitry 206, of the productivity metrics system 201 may communicate with various components of the dimensioning system 104 and the warehouse management system 106 of FIG. 1.

Figure 3:
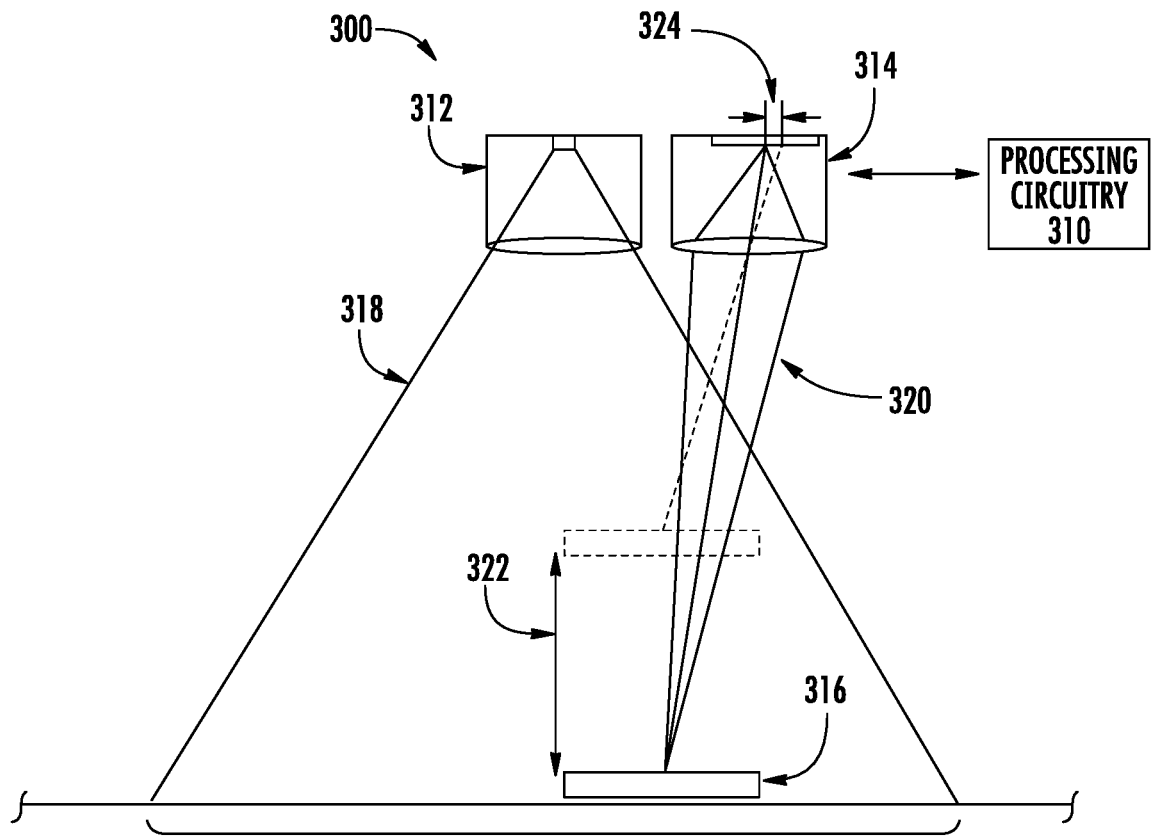
FIGS. 3 and 4 illustrate system diagrams of an exemplary dimensioning system for providing dimensional data to a productivity metrics system, in accordance with some example embodiments described herein.

FIG. 3 illustrates a system diagram of an exemplary dimensioning system 300 in accordance with some example embodiments described herein. Illustratively, the dimensioning system 300 may correspond to the dimensioning system 104, as illustrated and described in reference to FIG. 1. In the embodiment shown in FIG. 3, the dimensioning system 300 includes a pattern projecting unit 312 and a range imaging unit 314 (which correspond to 104-1-1 and 104-1-2 respectively, in FIG. 1). In this aspect, the pattern projecting unit 312 may radiate a light pattern onto an item 316 within a field of view 318 of the dimensioning system 300. In this aspect, a reflected light pattern 320 from the item 316 may be captured and detected by the range imaging unit 314. Illustratively, in an example operation of the dimensioning system 300, if an item's range 322 is changed, then the range imaging unit 314 may sense this change as a displacement 324 in the detected light pattern. In this aspect, a processing circuitry 310 within the dimensioning system 300 may convert this range information into a range image. In this way, the pattern projecting unit 312 and the range imaging unit 314 (for instance, a range sensor or a range camera) may operate together to produce the range image.

In some embodiments, the range image is processed by the processing circuitry 310 for generating dimensional data of the item 316. Illustratively, in an example implementation of the illustrated embodiment, the pattern projecting unit 312 and the range imaging unit 314 are positioned collinearly and are codirected towards the same field of view 318 (i.e., are positioned in a stereo arrangement). In this aspect, in accordance with the example implementation illustrated herein, the light from the pattern projecting unit 312, (e.g., the point cloud) may be invisible to the human eye, but the range imaging unit 314 may be sensitive to this light. In some embodiments, the range imaging unit 314 includes a range sensor having a color (i.e., red-green-blue-RGB) camera that is sensitive to visible light and sharing the field of view 318 with the pattern projecting unit 312 and the range imaging unit 314. In this aspect, the color camera may be used to display images for a user that are easily interpreted and less confusing than the gray scale range images or point cloud images.

Figure 4:
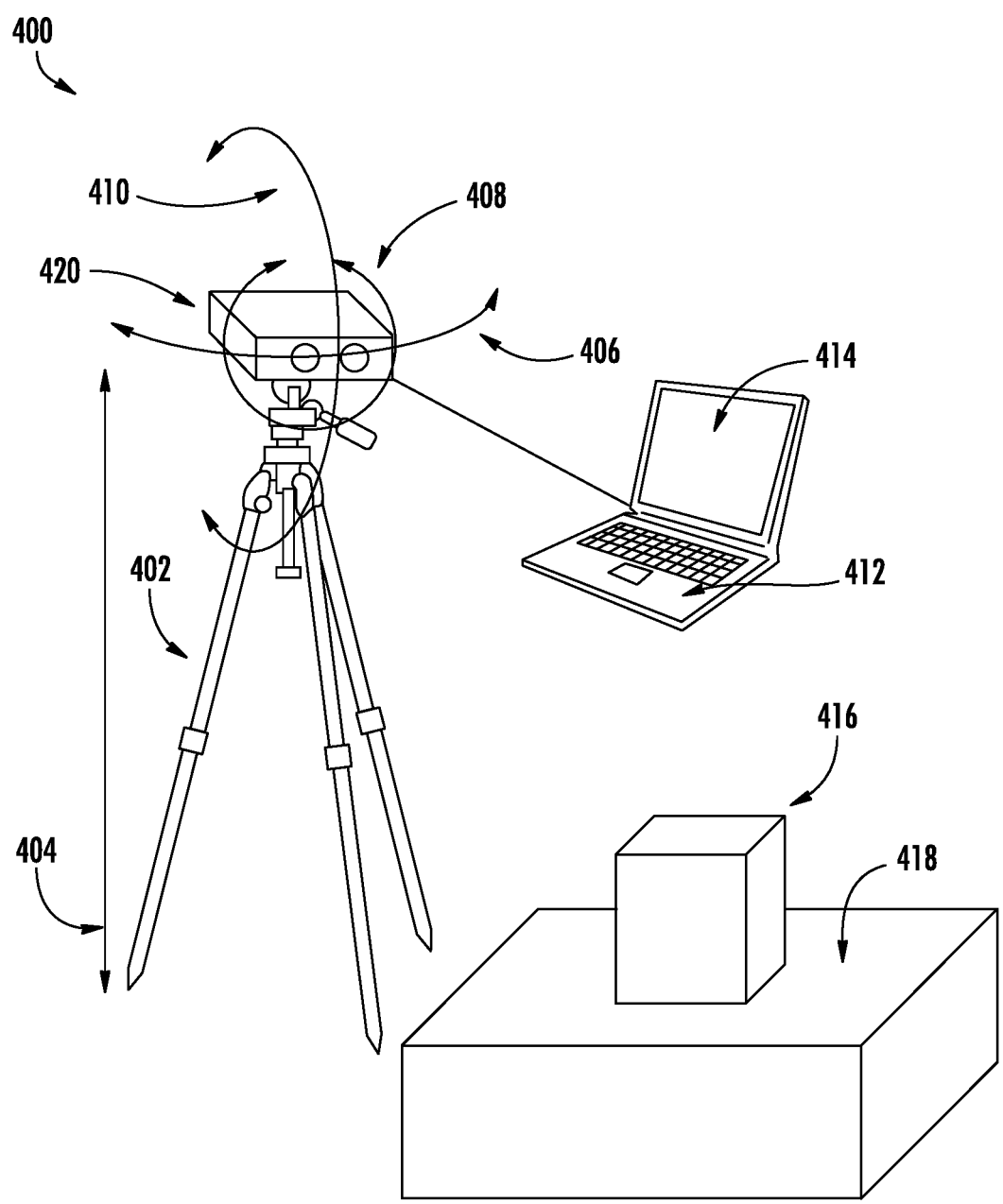

An exemplary package dimensioning system 400 is graphically shown in FIG. 4. Here, a dimensioner unit 420 (for instance, dimensioner unit 104-1 as illustrated and described in FIG. 1) is physically supported and positioned by a range-sensor support 402. In accordance with various example embodiments described herein, the package dimensioning system 400 may be installed within a material handling environment (such as, but not limited to the material handling environments illustrated in FIGS. 1-2) by means of the range-sensor support 402. For example, in one example implementation, the package dimensioning system 400 by means of the range-sensor support 402 may be installed in a zone (for instance, an accumulator zone or a zone before scanning and identification zone) in the material handling environments comprising conveyors belts or sortation systems.

In this regard, the range-sensor support 402 helps configure a range-sensor pose, which is defined by a range sensor's height 404 and orientation. In this regard, the orientation may include the range sensor's pitch 406, yaw 408, and/or roll 410. In an example implementation of said embodiment, a user may configure the range-sensor pose to match a target pose through the use of an adjustable range-sensor support 402. Illustratively, the adjustable range-sensor support 402 is shown in this embodiment as a tripod, though other support mechanisms (e.g., pole-mount, wall-mount, or ceiling-mount) may be used. In accordance with some exemplary embodiments described herein, an instruction set executed by a processing unit of a computing device 412 may cause the display of actionable insights on a display unit 414, including instructions for placing or positioning an item 416 on a platform 418. In this regard, the instructions may be in form of adjustment messages and include actionable insights provided by the productivity metric system 102 or 201 as described in FIGS. 1 and 2. It may be understood that the range-sensor pose and the target pose are relative to the platform 418 (i.e., reference plane or ground plane) on which the item 416 is placed on for dimensioning. Illustratively, the platform 418 may be selected by a user from a plurality of planar surfaces detected within the field of view before the poses are calculated. In this aspect, based on the actionable insights received by the worker on the computing device 412, the worker may position the item 416 in a pre-defined orientation on the platform 418. According to various embodiments described herein, the package dimensioning system 400 may be installed in the material handling environment 100 as illustrated in FIGS. 1 and 2, which may for example represent, a shipping station or a distribution center in a warehouse, where multiple items are being processed and handled by the worker for shipping or packaging.

Figure 5:
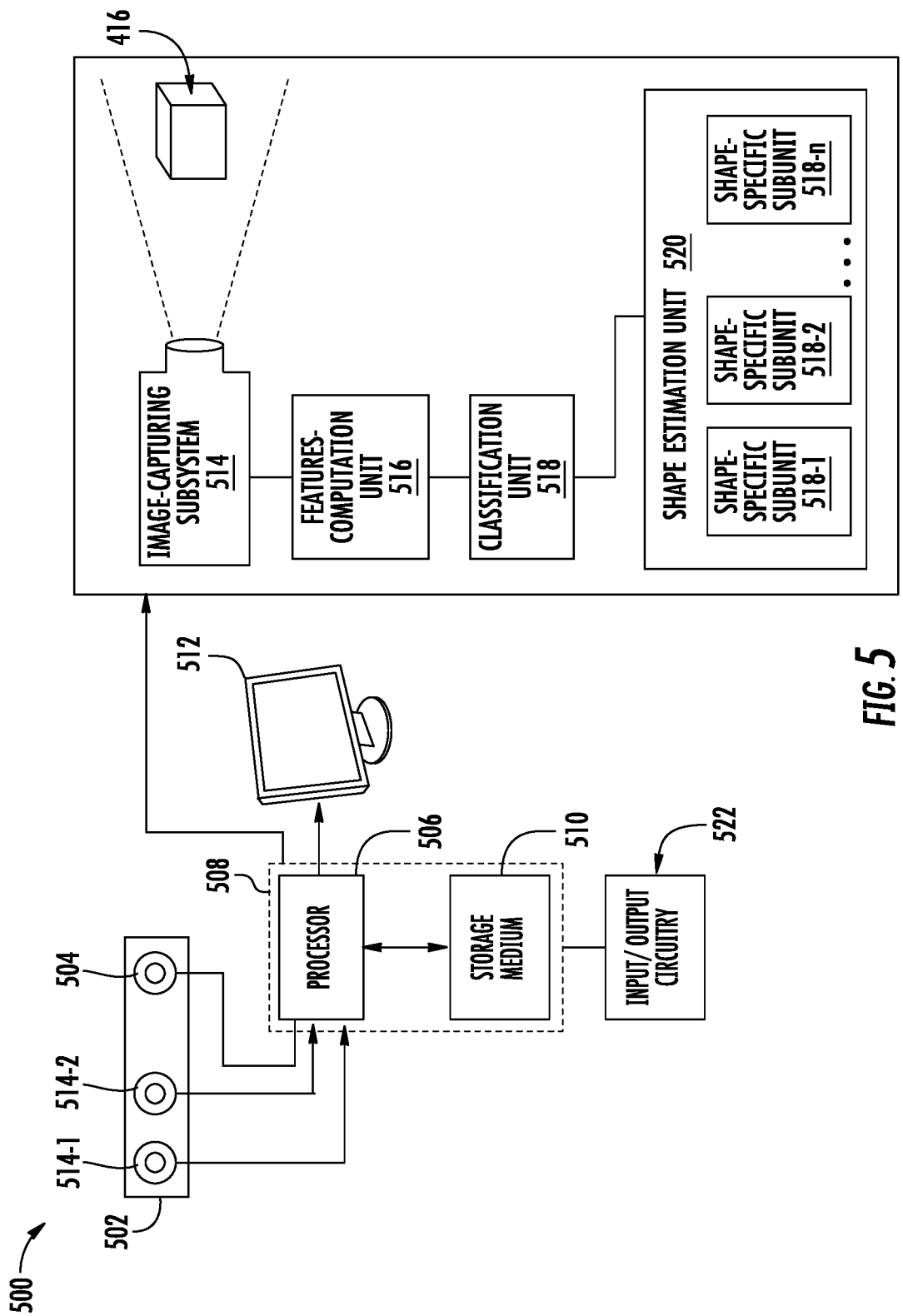
FIG. 5 illustrates a system diagram of the dimensioning system for computing the dimensional data in accordance with some example embodiments described herein.

FIG. 5 illustrates a system diagram of the dimensioning system 500 to determine dimensional data in accordance with some example embodiments described herein. It may be understood that the dimensioning system 500 may also correspond to any of package dimensioning systems 104, 300, and 400 as illustrated in FIGS. 1-4 respectively. As illustrated, the dimensioning system 500 includes a range sensor 502 including a pattern projecting unit 504 to create a light pattern that can be captured by a range imaging unit 514-2 (for instance, a range camera of the dimensioning system 500). In this regard, in an operation, a reflected light pattern, imaged by the range imaging unit 514-2, may be accessed and mathematically transformed into a range image, which is further transmitted from the range sensor 502 to a processor 506 integrated in a computing device 508 and communicatively coupled to the range sensor 502. In this aspect, the processor 506 may store the range image in a computer-readable storage medium 510. In an embodiment, a software or a set of logical instructions stored in the computer-readable storage medium 510 may configure the processor 506 to execute the program steps for determining dimensional data for an item based on processing the stored range image. In some embodiments, the range sensor 502 may include the components including, but not limited to, the processor 506, the computer-readable storage medium 510, and the input/output circuitry 522. In this regard, the range imaging unit 514-2 (such as a 3D camera) via an image capturing subsystem 514 (including a set of instructions executable by the processor 506) may capture a two-dimensional image of an item, like the item 416 positioned on a platform 418 as illustrated in FIG. 4. In this aspect, the captured image (e.g., range image) typically includes information in form of pixel values which correspond to distances of various points on the item 416 from the pattern projecting unit 504. In some example implementations, brighter pixels in the captured image indicate points on the item 416 which are in a shorter distance away than points on the item 416 represented by darker pixels in the captured image. Accordingly, based on this processing of the range image (including, but not limited to, identifying brighter pixels and darker pixels in the captured image), and identifying corresponding distance estimation between various points on the item 416, depth information regarding three-dimensional data of the item 416 is estimated from the captured 2D range image and an organized 3D point cloud may be generated by the image capturing subsystem 514. It may be understood that the organized point cloud has 3D points arranged in a 2D matrix, which corresponds to a rasterization of the range image. In this regard, the point cloud usually contains information regarding the positioning of points in a three-dimensional space (e.g., X, Y, Z coordinates) within the field of view of the image capturing subsystem 514 when the range image is acquired, including various points on the surface of the item 416. Thus, a three-dimensional representation of the item from the captured image is computed by the image capturing subsystem 514.

Typically, information regarding positions of various points on a surface of the item 416 in the captured image is typically referred as "object information." In an aspect, a feature computation unit 516 may access this object information and analyze the object information to identify certain surface features of the item 416 from the captured image of the item 416. To identify various features for categorizing the item, the feature computation unit 516 may analyze a curvature c and orientation θ for each point in the point cloud representing the surface of the item 416 with respect to a reference plane in a field of view of the dimensioning system 500. Thus, based on consideration of orientation information for each point on surface of the item 416 in the point cloud relative to the reference plane (for example, a ground surface or a normal to the point), features used for categorizing the item 416 into any of a shape type may be identified.

Upon identification of the features, in accordance with the illustrated embodiment, a classification unit 518 of the dimensioning system 500 may categorize the item 416 into a shape type (for example, but not limited to a cuboid, cylinder, or prism) and estimate its dimensions. Illustratively, the classification unit 518 may be configured to categorize an item's shape (such as, but not limited to, as a rectangular box, a right circular cylinder lying flat, a right circular cylinder standing vertically, a right regular prism with triangular bases lying flat, or a right regular prism with triangular bases standing vertically) based on historical knowledge of item shapes that are usually processed in the material handling environment 100. Thereafter, based on a categorization or classification of the item's shape, a shape estimation unit 520 of the dimensioning system 500 estimates dimensional data including dimensions of the item 416. Illustratively, the shape estimation unit 520 may include a plurality of shape-specific subunits 518-1, 518-2 . . . 518-N, adapted for estimating the dimensions of respective shapes. For example, and without intending to limit the disclosure to any particular embodiment, upon the classification unit 518 categorizing an item 416 as a rectangular box (e.g., by analysis of the feature set derived from the point cloud associated with the object's surface), the shape estimation unit 520 would utilize the shape-specific subunit 518-1 adapted for estimating the dimensions of rectangular boxes. Accordingly, based on processing the range image, dimensional data representing dimensions of the item 416 (including, volume, dimensional weight, height, and width corresponding to the item 416) may be determined by the dimensioning system 500. Further, an input/output circuitry 522 of a dimensioning system, for instance, input/output circuitry 208 as illustrated in FIG. 2, may transmit the determined dimensional data to the material handling environment 100 as illustrated in FIGS. 1 and 2.

Illustratively, in an embodiment, a software or a set of logical instructions stored in the storage medium 510 may also configure the processor 506 to execute the program steps for generating adjustment messages necessary to facilitate the positioning of at least one of the range sensor 502 or an item 416 on a platform 418 as illustrated in FIG. 4 for dimensioning. In this regard, in an embodiment, the processor 506 may transmit the adjustment messages to a display 512. Illustratively, these messages may be displayed along with an image of the range sensor's field of view. In this aspect, the image of the field of view may be an image captured by the range imaging unit 514-2 or may be a color image created by a color camera 514-1 configured with the same field of view as the range imaging unit 514-2. In this aspect, the color camera 514-1 is optional but may enhance the user's experience, as these images may be easier to understand than the gray scale range images. Illustratively, according to various embodiments described herein, the adjustment messages may be included in notifications which provides actionable insights to various workers working in the material handling environment 100 for positioning of items in a field of view of the dimensioning system in order to accurately determine the dimensional data of the respective items.

It may be understood that the above described technique for shape estimation and determination of the dimensional data, is one example approach for determining dimensions of the item by the dimensioning system. However, in accordance with various other embodiments of the present application, the dimensioning system 500 may utilize other principles known in field of image processing, such as, but not limited to those based on, time of flight estimation, triangulation or phase shift estimation, for estimating 3D shapes of the item and determination of the dimensional data of the item.

FIGS. 6 through 9 illustrate example flowcharts of the operations performed by an apparatus, such as productivity metrics system 102, 201 of FIGS. 1 and 2 respectively, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 6 through 9, when executed, convert a computer or processing circuitry into a particular machine configured to perform an example embodiment of the present invention. Accordingly, the operations of FIGS. 6 through 9 define an algorithm for configuring a computer or processor, to perform an example embodiment. In some cases, a general purpose computer may be provided with an instance of the processor which performs the algorithm of FIGS. 6 through 9 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

Figure 6:
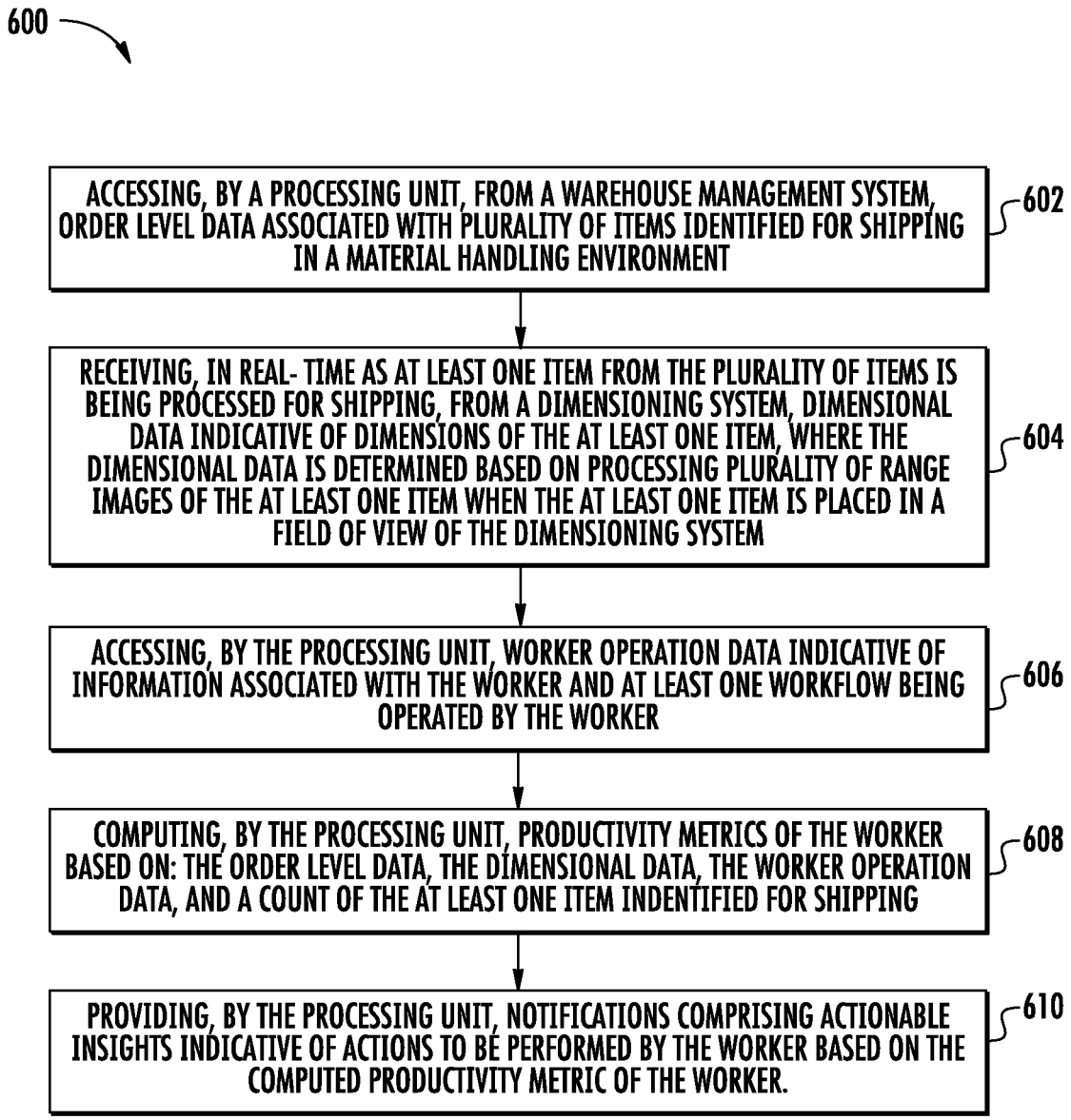
FIG. 6 illustrates flowchart describing a method of providing real-time productivity information of a worker in a material handling environment, in accordance with various example embodiments described herein.

FIG. 6 illustrates flowchart describing a method 600 of providing real-time productivity information of a worker in a material handling environment in accordance with various example embodiments described herein. Illustratively, the method 600 has been described in conjunction with system and components described FIGS. 1-5.

At step 602, a productivity metrics system, such as the productivity metrics system 201, includes means, such as processor 202, for accessing, "order level data" associated with plurality of items identified for shipping in a material handling environment, for instance the material handling environment 100. Illustratively, in an embodiment, the processor 202 of the productivity metrics system 201 may access the order level data, via communication through the input/output circuitry 208, from the warehouse management system 106 over the communication network 110. In accordance with various example implementations of said embodiment, the order level data may include specifications of a customer order identified for the shipping. For instance, the order level data may include multiple item names and association of the at least one item from amongst the multiple item names with the customer order. In an example, the order level data may include a list of items, such as packages, which are to be processed for shipping for a customer's order. The list may include details related to the product and shipping of the product. For example, the list may include, but not limited to, product names, quantity ordered for each of a product type, pricing information, customer account details, customer payment information, shipping details, relationship or association of an item with the customer order, item information based on previous customer orders, etc.

At step 604, the productivity metrics system 201, includes means, such as processor 202, for receiving, in real-time, dimensional data indicative of dimensions of at least one item from amongst the plurality of items. In this regard, the processor 202 receives the dimensional data, from an item dimensioner, for instance, any of the package dimensioning systems 104, 300, 400, and 500 as illustrated and described in FIGS. 1-5. For purpose of clarity and readability, the dimensioning system 500 illustrated in FIG. 5 is referred hereinafter throughout the description for describing steps related to the dimensional data. However, it may be understood that any of the package dimensioning systems 104, 300, or 400 may perform similar operations as described for the dimensioning system 500 hereinafter. As described in reference to FIGS. 3-5, the dimensional data for one or more of the plurality of items may be determined by the dimensioning system 500 based on processing plurality of range images of the at least one item, when the at least one item is placed in a field of view of the dimensioning system 500. Further, details for determination of the dimensional data based on the processing of range images of the at least one item are been described with reference to package dimensioning systems 300, 400, and 500 as described in FIGS. 3-5. Illustratively, in an example implementation, the processor 202 may receive the dimensional data from the dimensioning system 500 via the input/output circuitry 208. In accordance with various example implementations of said embodiment, the dimensional data of an item may include dimensions of the item, including, but not limited to, volume, dimensional weight, height, and width of the at least one item.

At step 606, the productivity metrics system 201, includes means such as processor 202 for accessing worker operation data indicative of information associated with the worker and at least one workflow being operated by the worker. In this regard, in an embodiment, the processor 202 may access the worker operation data from the warehouse management system 106 via the input/output circuitry 208. Illustratively, in an example embodiment, an administrator (or a warehouse manager handling management of operations performed by various workers in a material handling environment 100) may submit a request via an interface associated with input/output circuitry 208 of the productivity metrics system 201 for accessing the worker operation data. In this aspect, the worker operation data may correspond to data pertaining to workers and various activities performed by the workers (i.e. worker operation data) in the material handling environment 100. Illustratively, the worker operation data may be accessed via a database associated with warehouse management system 106, such as an enterprise database or an organizational database storing information about worker profiles and roles and responsibilities of the workers. For instance, in some examples, the worker operation data associated with the worker may include, but not limited to, at least one of a duration of employment for the worker, designation indicative of a role and responsibility of the worker in the material handling environment 100, etc. In some examples, the worker operation data may also include at least one workflow being operated by the worker.

As discussed in reference to FIG. 1, the workflows here correspond to a series of tasks or steps to be performed by a worker in a defined sequence for completing various operations within the material handling environment 100. In this aspect, different types of workflows, including but not limited to voice directed workflows, are executed on the computing nodes like 112-1, 112-2 . . . 112-N, such as portable digital assistants (PDAs) or a headset connected to a mobile device and a server. In this aspect, the warehouse management system 106 may store various types of workflows, which are downloaded on the computing nodes 112-1 . . . 112-N via the communication network 110 from a server of the warehouse management system 106 and executed on these devices by the workers for performing various types of tasks. For examples, these workflows may correspond to set of instructions for performing operations including, but not limited to, picking of items from various locations in an inventory according to a customer order, checking shortage of items in an inventory, or determining a count of items available in stock within an inventory or a shipment processing workflow (which includes scanning a coded information on various items identified for shipping and facilitating packing or unpacking of the identified items, etc.).

Illustratively, in some examples, the worker operation data may also include use-case specific data, i.e. data pertaining to requirements based on a situation or a use case in a workflow. For example, in some material handling environments, such as shipping stations, the worker operation data may include, but not limited to, number of individual stock keeping units (SKU)s to be handled by a worker per customer order; rules for packing multiple SKUs into one over-pack based on SKU dimensions, over-pack dimensions and order of picking; rules for customized processing for irregular packages; factors to be considered for customized processing for packages for export; factors to be considered by the workers for customized processing for fragile packages; factors to be considered by the workers for creation and application of customer specific label for certain customers; and/or conditions for packing in a customer specific packaging for specific customers which a worker has to follow. It may be noted that these are some examples of the worker operation data which may be accessed from the warehouse management system 106 by the processor 202. However, in alternate embodiments, there may be other parameters associated with worker profiles in the material handling environment and/or use-cases or workflows that are being operated by the worker. For instance, in some embodiments, the worker operation data associated with the workflow being operated by the worker may correspond to rules including, but not limited to: rules for packaging items based on at least one of an item type or a customer type (for example, fragile items or consumable goods having different packing requirements); factors to be considered for irregularity in dimensions of the items; rules for creation and affixing of labels on the items; and rules for packing multiple stock keeping units into one over-pack based on the dimensional data for the items.

At step 608, the productivity metrics system 201, includes means, such as processor 202, for computing productivity metrics of the worker based on: the order level data, the dimensional data, the worker operation data, and a count of the at least one item identified for shipping. In this regard, in an embodiment, the productivity metrics system 201 includes means such productivity metrics generator 210 communicatively coupled to the processor 202 and computes the productivity metrics of the worker by calculating order throughput data and dimensional throughput data, and combining order throughput data and dimensional throughput data to compute the productivity metrics as a weighted representation, which may be utilized for accessing performance of the worker in the material handling environment. Further details of computing the productivity metrics by the productivity metrics system 201 are described in reference to FIG. 8.

At step 610, the productivity metrics system 201, includes means, such as processor 202, for providing, notifications comprising actionable insights indicative of actions to be performed by the worker based on the computed productivity metric of the worker. Further details of the notifications are described in reference to FIG. 9.

Figure 7:
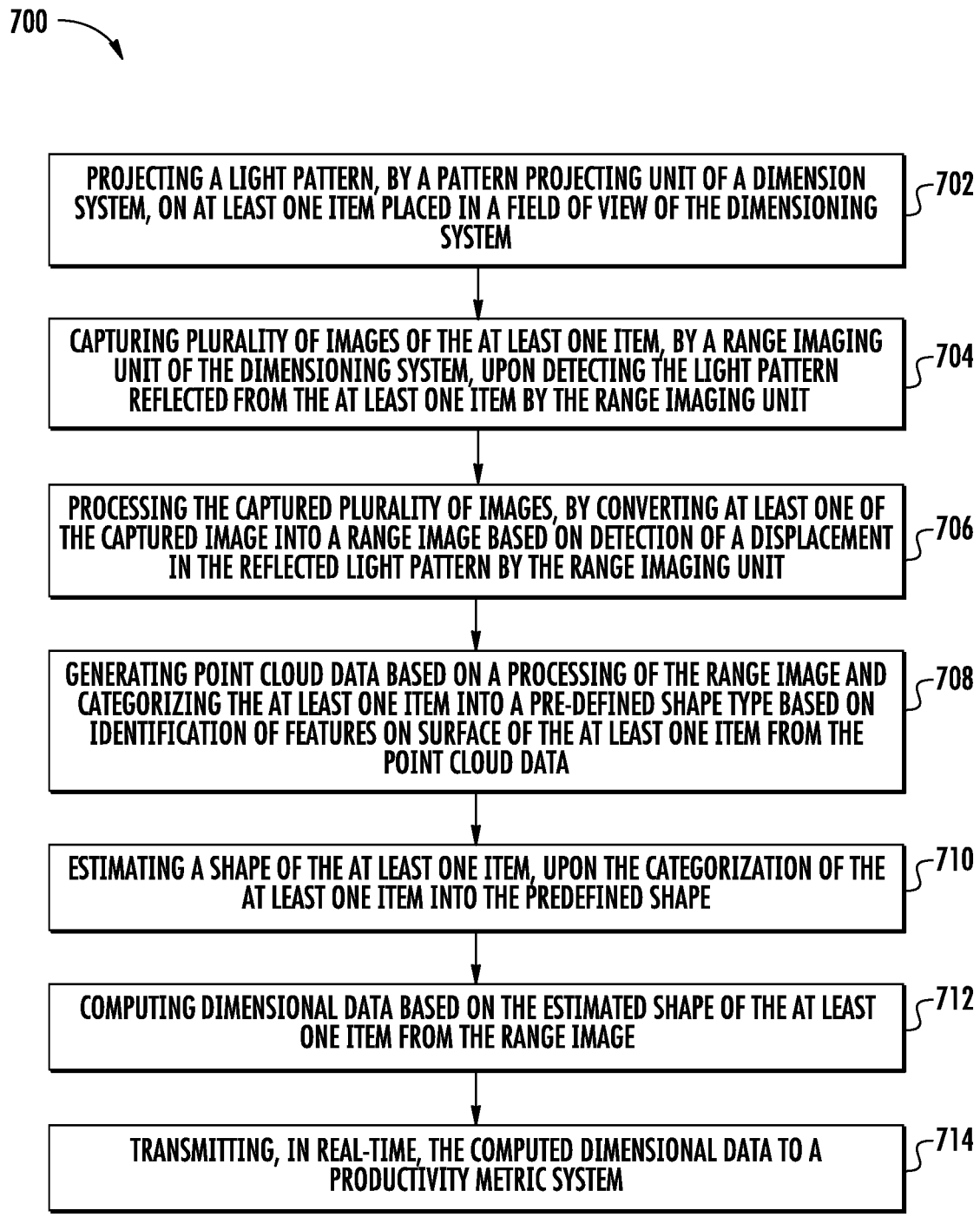
FIG. 7 illustrates a flowchart describing a method of computing dimensional data by the dimensioning system, in accordance with some example embodiments described herein.

FIG. 7 illustrates a flowchart describing a method of computing dimensional data and transmitting the computed dimensional data to a productivity metric system, in accordance with some example embodiments described herein. Illustratively, the flowchart 700 has been described in conjunction with system and components described FIGS. 1-5.

At step 702, the dimensioning system 500 includes means, such as the pattern projecting unit 504, for projecting a light pattern on at least one item placed in a field of view of the dimensioning system. In this regard, in an example implementation, the dimensioning system 500, including the pattern projecting unit 504, may emit Infra Red (IR) rays in a particular pattern on an item, for example, the item 416 placed on the platform 418.

At step 704, the dimensioning system 500 includes the range imaging unit 514-2 and the color camera 514-1 and means, such as image capturing subsystem 514, for capturing plurality of images of the at least one item. In this regard, in an embodiment, a range sensor, such as the range sensor 502 may comprise any of the range imaging units 514-2 and the color camera 514-1, which upon detecting a reflection of the projected light pattern captures multiple images of the at least one item positioned in a field of view of the dimensioning system 500. Referring to the example implementation, described at step 702, reflected rays of the projected IR pattern are captured by an IR sensor, for example, the range imaging units 514-2 and the color camera 514-1.

At step 706, the dimensioning system 500 includes means, such as the image capturing subsystem 514 communicatively coupled to the processor 506, for processing the captured plurality of images. In this regard, the processor 506, via means such as image capturing subsystem 514, may convert at least one of the captured image into a range image based on a detection of displacement in a range of the at least one item detected by the range imaging unit 514-2, upon projection of the light pattern by the pattern projecting unit 504. In this regard, the captured images on conversion are referred as the range images as these images contains pixel values corresponding to distance of various points on an item being imaged in the captured image to the IR sensor (i.e. the range imaging unit 514-2 and the color camera 514-1 of the dimensioning system 500).

At step 708, the dimensioning system 500 includes means, such as image capturing subsystem 514, the feature computation unit 516, and the classification unit 518, for generating point cloud data based on a processing of the range image and categorizing the at least one item into a pre-defined shape type based on identification of features on surface of the at least one item from the point cloud data. In this regard, the dimensioning system 500 uses geometrical information such as pre-defined shapes of items to create a point cloud image of the item 416 positioned on the platform 418 in the field of view of the dimensioning system 500.

At step 710, the dimensioning system 500 includes means, such as the shape estimation unit 520, for estimating a shape of the at least one item, upon the categorization of the at least one item into the pre-defined shape. In accordance with various example embodiments described herein, the point cloud data is then passed through various dimensioning algorithms executed by the shape estimation unit 520 and the shape specific subunits to calculate a length, width and height of the item 416. In some cases, if the item 416 is of an irregular shape, the shape estimation unit 520 and the shape specific subunits may execute algorithms for creating a minimum bounding box that can fit the irregular object and provide the estimation of shape of the item 416 based on the minimum bounding box.

At step 712, the dimensioning system 500 includes means, such as the processor 506 for computing the dimensional data based on the estimated shape of the at least one item from the range image. As described in reference to FIG. 5, the dimensional data of the item being dimensioned may include information about dimensions of the item, including but not limited to, volume, dimensional weight, height, and width of the item 416.

At step 714, the dimensioning system 500, includes means, such as an input/output circuitry 522 for transmitting the computed dimensional data to a productivity metric system, for instance, the productivity metric systems 102, 201, as illustrated in FIGS. 1 and 2 respectively. In this regard, in accordance with various example embodiments described herein, the dimensional data may be transmitted to the productivity metrics system 201 in real-time, i.e. as in when the items are being dimensioned or placed in the field of view of the dimensioning system 500. In some example implementations, the dimensional data may be transmitted via the input/output circuitry 522 to the productivity metrics system 201 in response to a request received from the communications circuitry 206, for providing the dimensional data. Alternatively, in some example implementations, the dimensional data may be provided to the productivity metrics system 201, periodically at regular intervals of time, for a set of items, which are being dimensioned by the worker using the dimensioning system 500.

Figure 8:
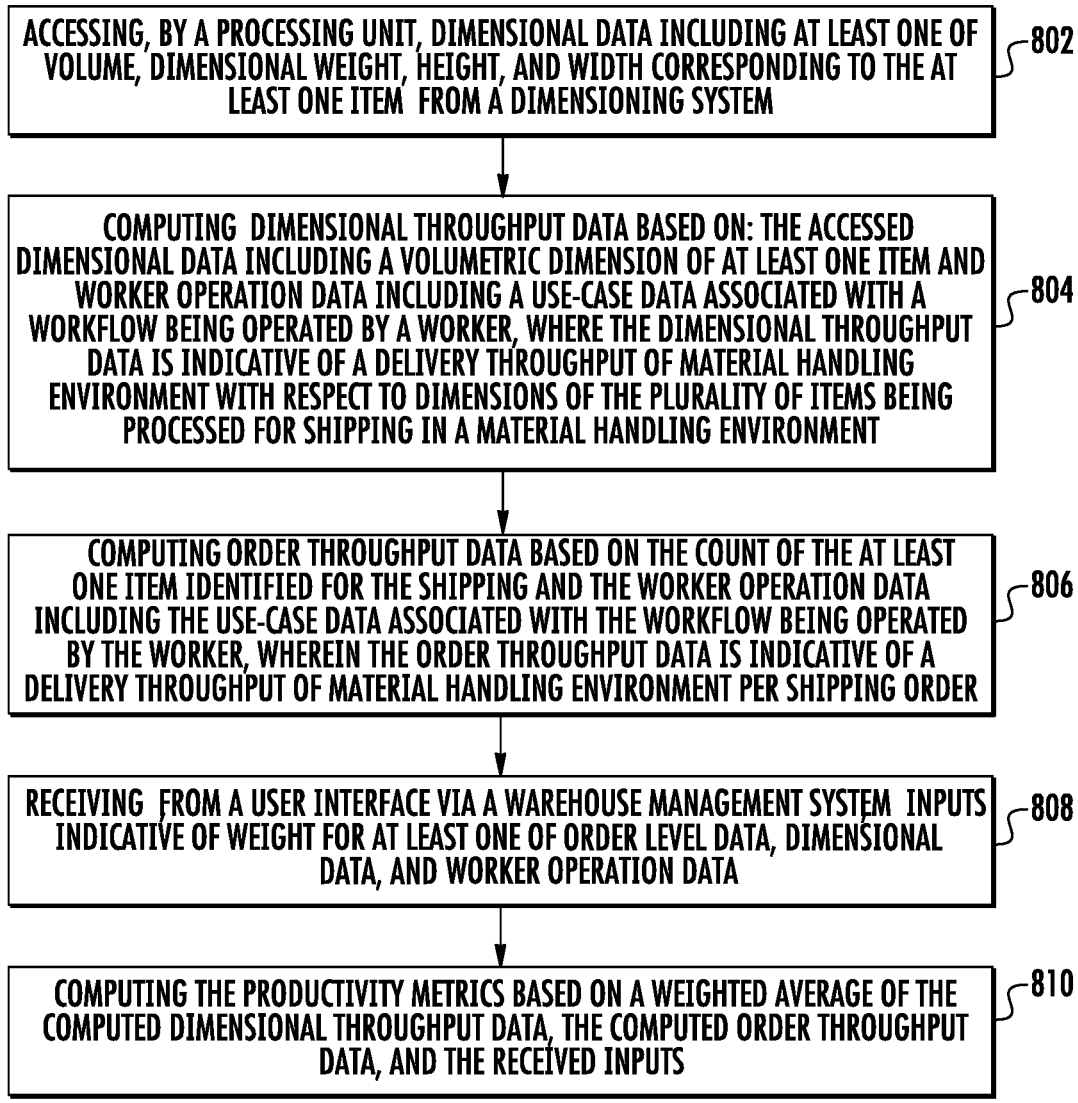
FIG. 8 illustrates a flowchart describing a method of computing productivity metrics of workers in the material handling environment, in accordance with some example embodiments described herein.

FIG. 8 illustrates a flowchart describing a method of computing productivity metrics, in accordance with some example embodiments described herein. Illustratively, the flowchart 800 has been described in conjunction with system and components described FIGS. 1-5.

At step 802, the productivity metrics system 201 includes means, such as the processor 202 via the communications circuitry 206, for accessing dimensional data including at least one of volume, dimensional weight, height, and width corresponding to the at least one item, from the dimensioning system 104.

As illustrated, at step 804, the productivity metrics system 201, includes means, such as the processor 202, for computing dimensional throughput data based on: the accessed dimensional data including a volumetric dimension of at least one item and worker operation data including a use-case data associated with a workflow being operated by a worker. The volumetric dimension herein may refer to dimensional weight typically used in freight and logistics such as in commercial freight transport (including courier and postal services), wherein the dimensional weight is calculated from the length, width and height of the item measured by a dimensioning system, such as dimensioning system 500. In this aspect, in accordance with some embodiments described herein, the dimensional throughput data may be indicative of a delivery throughput of material handling environment with respect to dimensions of the plurality of items being shipped in the material handling environment. Further details of computing the dimensional throughput data are described in reference to step 810 below of the description.

At step 806, the productivity metrics system 201, includes means, such as the processor 202, for computing an "order throughput data" based on count of the at least one item identified for the shipping and the worker operation data including the use-case data associated with the workflow being operated by the worker. In some examples, the worker may identify the count of the at least one item based on scanning encoded information, such as, barcode labels or based on reading of radio frequency identification (RFID) tags available on the products or at different locations in the material handling environment using an encoded information reader. For instance, in one example, products or items in an inventory may include coed information labels, for instance, any of barcodes, QR codes, etc. that may include product information in encoded form or identifiers for identifying various information associated with the items stored in a database in form of datasets. In this aspect, upon successful scanning and decoding of such coded information, product specifications, such as price, nutritional information, manufacturing details etc., may be retrieved on the devices like the computing node 112-1. In such situations, a count of the at least one item may be identified by scanning, for instance via the computing node 112-1 such as a PDA or mobile device of the worker, respective barcode labels on the products. In such cases, each successful scan, including scanning and/or decoding, may account for an increase in a count of the products maintained at an inventory database, such as the warehouse management system 106. Illustratively, in some examples, such encoded labels may also be located at various locations, including shelves, bins, or aisles, and the location information may be encoded on the labels. In such cases, a location specific count of the at least one item may be identified by scanning the labels on the items along with scanning location specific labels on respective location. As described, the count of the at least one item along with worker operation data (for example, the worker operation data as described at step 608 of FIG. 6) may be used for computing the order throughput data. Alternatively, in another embodiment, the count of the at least one item may be determined based on detection by the dimensioning system 104, placement of the at least one of item in the field of view of the dimensioning system 104. In this regard, as soon as an item is being placed in the field of view of the dimensioning system 104, a counter for maintaining count of items being processed for shipping at the warehouse management system 106 is incremented. In this aspect, based on determining the count of the at least one item, the order throughput data indicative of a delivery throughput of material handling environment per shipping order may be computed. Further details of computing the order throughput data are described at step 810 below of the description.

At step 808, the productivity metrics system 201, includes means, such as the input/output circuitry 208, for receiving, from a user interface via the warehouse management system 106, inputs indicative of weight associated with at least one of, order level data, dimensional data, and the worker operation data in the weighted calculation described herein. In this regard, in some examples, an administrator of a warehouse may provide, via an input/output interface of the warehouse management system 106, various inputs such as, but not limited to, inputs regarding a portion of day to be considered for calculating productivity metrics, duration/time for calculating productivity metrics (for example, per day, per hour, per shift, etc.). Such inputs may be used for determining weight to be considered in determining each of the dimensional data, the worker operation data, and the order level data, which are used for computing the productivity metrics.

Illustratively, the productivity metrics system 201 may receive different weights as inputs from workers in different situations. For example, in situations where in a shipping center where shipment processing is done for items which are heavy boxes or big sized containers, more weights may be assigned for the dimensional data when compared to weights assigned for the order level data and the worker operation data in conducting the weighted calculation described herein. Similarly, in some other situations, where a shipping center processes high volume of customer orders per day, a bigger weight may be assigned to the order level data. Accordingly, the productivity metrics system 201 may receive inputs pertaining to different weights via the warehouse management system 106. Illustratively, in some cases, the inputs including information for the weights may be received in real-time. For instance, an administrator assigns weights to any of the order level data, the dimensional data, and/or the worker operation data based on real-time conditions of respective entities, i.e. items, workers, workflows, and dimensioning in the material handling environment. In some other embodiments, such weights may be pre-defined values stored in a database of the warehouse management system 106, and may be retrieved via the input interface based on a selection of weights, for instance, from a drop-down list displayed on the interface of the workflow management server (WMS) 106.

At step 810, the productivity metrics system 201, includes means, such as the productivity metrics generator 210, for computing the productivity metrics based on a weighted average of the computed dimensional throughput data, the computed order throughput data, and the received inputs. In this regard, the productivity metrics generator 210 may utilize various algorithms for computing the productivity metrics based on a weighted average of the dimensional throughput data and the order throughput data and/or inputs received, for instance, the count of the at least one item.

Illustratively, in one example embodiment, the productivity metrics generator 210 may compute the productivity metrics based on following formula:

$$\text{Productivity Metric} = (T_d * F_d + T_o * F_o) * C1_f * U_f$$

In this regard, Td stands for dimensional throughput data, To stands for order throughput data, Fd stands for dimensional throughput factor, Fo stands for order throughput factor, and C1f and Uf stands for overall use-case factor and use-case factor related to the worker operation data respectively. In this aspect, the use-case factor may be determined based on the use-case data associated with at least one of a worker and at least one workflow which is being operated by the worker, the dimensional throughput factor may be determined based on the dimensional throughput data, and the order throughput factor may be determined based on the order throughput data respectively.

Illustratively, the dimensional throughput data may be computed based on following formula:

$$T_d(\text{Dimensional throughput data}) = (V_1 * C2_1 + V_2 * C2_2 + V_3 * C2_3 + \ldots V_n * C2_n)/t$$

Here, $V_n$ stands for volume of $n^{th}$ package or item being handled by the worker, C2n stands for the use-case factor for the $n^{th}$ package or item being handled by the worker, n is a total number of items being handled for processing by the worker, and t is the total time spent by the worker in hours.

Illustratively, the order throughput data may be computed based on following formula:

$$T_o(\text{Order throughput data}) = (O_1 * C3_1 + O_2 * C3_2 + O_3 * C3_3 + \ldots O_m * C3_m)/t$$

Here, Om stands for number of packages in a $m^{th}$ order, m is total number of customer orders handled by the worker, C3m stands for use-case factor for $m^{th}$ order, and t is the total time spent by the worker for processing respective order in hours.

Figure 9:
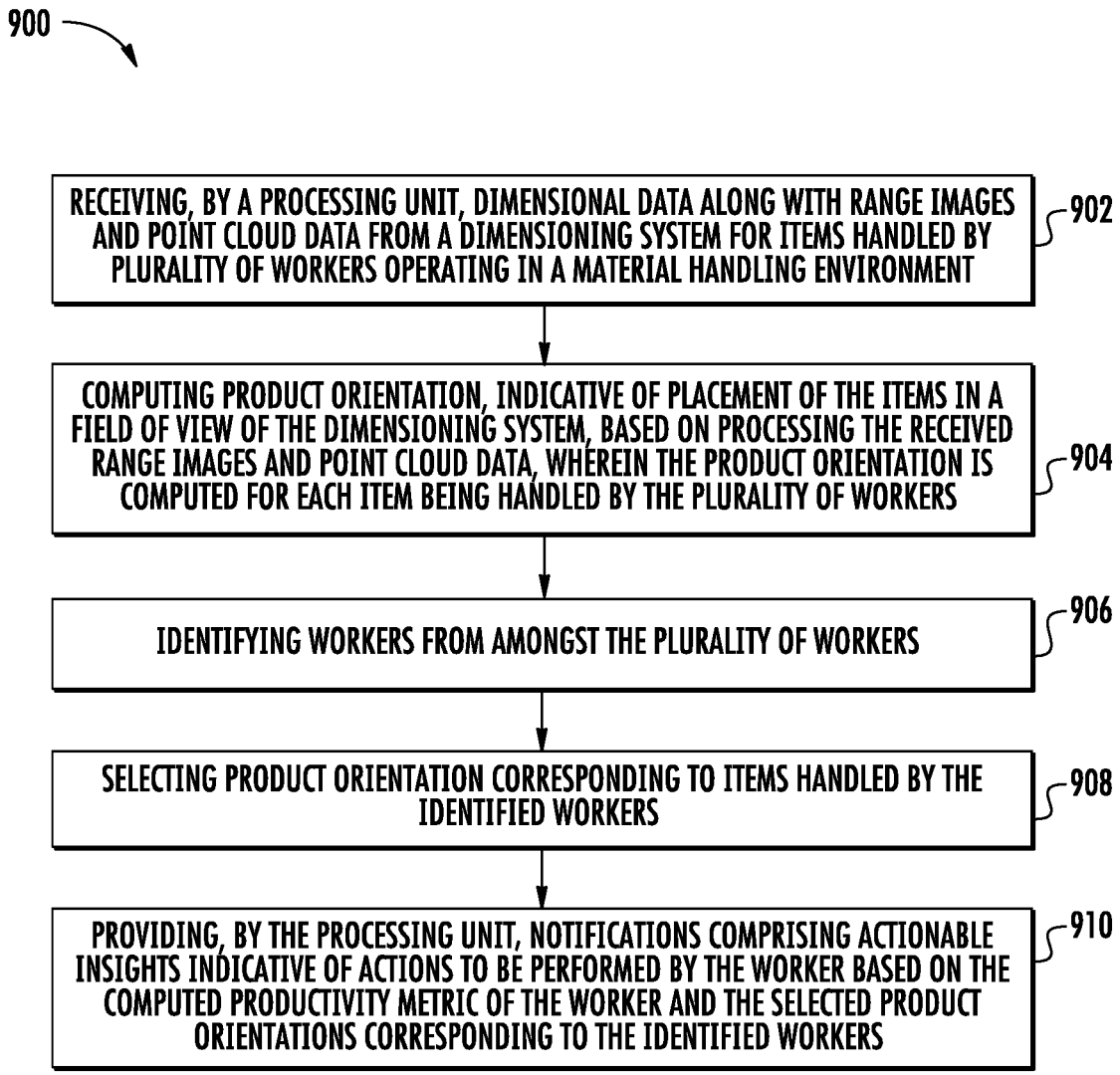
FIG. 9 illustrates a flowchart describing a method of providing notifications based on the productivity metrics of workers, in accordance with some example embodiments described herein.

FIG. 9 illustrates a flowchart describing a method of providing notifications based on productivity metrics of workers, in accordance with some example embodiments described herein. Illustratively, the flowchart 900 has been described in conjunction with system and components described FIGS. 1 and 2.

At step 902, the productivity metrics system 201 may include means, such as the processor 202 for receiving dimensional data along with corresponding range images and point cloud data for various items handled by multiple workers in the material handling environment. In this regard, in an embodiment, the productivity metrics system 201, may receive the dimensional data via the communications circuitry 206 from the dimensioning system 104 over the communication network 110. In this aspect, FIGS. 3-5 may be referred where details of the range images and the point cloud data are described.

At step 904, the productivity metrics system 201 may include means, such as processor 202 for computing "product orientation" indicative of placement of each of the various items in a field of view of the dimensioning system 104 based on processing the received range images and point cloud data. In accordance with some example embodiments, the product orientation here refers to information regarding positioning of an item or a product in a field of view of the dimensioning system 104. It may be understood, that for dimensioning, various items are to be positioned in a defined manner, for instance, based on following some protocols, within the field of view of the dimensioning system 104. Particularly, accurate dimensioning of the items by the dimensioning system 104 depends on an orientation in which these items are positioned in the field of view of the dimensioning system 104 (for instance an orientation of the item 416 while positioning the item 416 on the platform 418). Also, different workers working in the material handling environment may have their unique tendency or way of positioning the items for dimensioning before processing the items for shipping. Thus, in operation, the productivity metrics system 201 computes product orientation for each item that is being handled by the worker. Illustratively, in an example referring to FIG. 4, in an operation, the processor 202 may compute an orientation of the item 416, including, but not limited to, coordinates representing a position of the item 416 on the platform 418, information about which lateral surface of the item 416 from amongst all surfaces of the item 416 faces the dimensioning system 104 or an orientation (i.e. either horizontal or vertical relative to a reference plane of the platform 418 on which the item 416 is being placed), etc. In this regard, in some example implementations, the product orientation may be computed based on processing the received range images and the point cloud data, which may include identification of features (including surface features of the at least one item) from the range images, as described in context of the operations performed by the feature computation unit 516 with reference to FIG. 5. In this regard, in accordance with some example implementations, the processing of the range images and corresponding point cloud data may be performed by the productivity metrics system 201, and in particular, by the processor 202 of the productivity metrics system 201.

At step 906, the productivity metrics system 201 may include means, such as the productivity metrics generator 210, for identifying workers from amongst the plurality of workers having a pre-defined productivity metric. In this regard, the productivity metrics generator 210 may access a list of all workers working in the material handling environment from the warehouse management system 106. In some cases, the productivity metrics generator 210 may access this data for workers across several material handling environments from the global reference database 108. Based on accessing the list of workers, the productivity metrics generator 210 may identify a set of workers having a pre-defined productivity metric. In this aspect, the productivity metrics generator 201 may apply machine learning techniques which may include accessing over a period of time the data associated with workers, (including, but not limited to worker behavior and manner of handling and positioning the items for dimensioning), for the workers operating globally in various material handling environments and applying the machine learning techniques for identifying workers having pre-defined productivity metrics to provide actionable insights to other workers operating within such material handling environments. In some examples, the pre-defined productivity metric may correspond to the productivity metrics that are above a pre-defined threshold indicating an optimum performance level. For instance, in one embodiment, the productivity metric generator 210 may identify workers for whom the productivity metrics is 10% above the usual or average productivity. For example, if an usual operating rate of order throughput is 5 customer orders or 200 items to be processed for shipping in one hour, workers who can process more than 6 customer orders or 220 items in an hour are identified by the productivity metrics generator 210.

At step 908, the productivity metrics system 201 may include means, such as the processor 202, for selecting product orientation corresponding to items handled by the identified workers, i.e. for the workers identified at step 906. In this regard, the productivity metrics system 201, may select product orientations, from amongst all of the computed product orientations for the various items handled by all the workers, as illustrated at step 904. Because the identified workers whose productivity metrics meet or are above the pre-defined threshold are likely to correctly position items in the field of view of the dimensioning system 104, the dimensional data computed for these items would be likely accurate. Thus, for the identified workers, the product orientations having information regarding positioning of an item or a product, in the field of view of the dimensioning system 104, is selected. In this aspect, the information may include, but not limited to, information about coordinates representing position of the item 416 on the platform 418; information about which lateral surface, like, top, bottom, side walls, etc., of the item 416 from amongst all surfaces of the item 416, faces the dimensioning system 104; an orientation, i.e. either horizontal or vertical with reference to a plane of the platform 418 in which the item 416 is being placed on the platform 418 etc. as mentioned before).

At step 910, the productivity metrics system 201 may include means, such as processor 202, for providing notifications including actionable insights indicative of actions to be performed by the worker based on the computed productivity metric and the selected product orientations for the identified workers. In this aspect, the actionable insights may include instructions for positioning the at least one item in a pre-defined orientation in the field of view of the dimensioning system 104. In some examples, the pre-defined orientation is from the computed product orientations, which are selected for the workers as illustrated at step 908, and is based on protocols to be followed by the worker for positioning the at least one item in the field of view of the dimensioning system 104. Illustratively, in such cases, the protocols to be followed for positioning the item in the field of view of the dimensioning system 104 may include at least one of: positioning the at least one item at a center of the field of view of the dimensioning system 104; positioning the at least one item in the field of view of the dimensioning system 104 with a surface of the item having largest surface area facing a scale of the dimensioning system 104; positioning the at least one item with a surface on which labels, such as barcodes, RFID tags, are affixed facing towards the dimensioning system 104; positioning each item from amongst the plurality of items with a pre-defined gap when each of the item is positioned in the field of view of the dimensioning system 104; and positioning items having cylindrical shape from amongst the plurality of items in a horizontal orientation with respect to a platform on which the items are positioned in the field of view of the dimensioning system. Illustratively, these notifications may be transmitted via the communications circuitry 206 to one or more of the computing nodes 112-1, 112-2 . . . 112-N over the communication network 110. In some implementations, the notifications may be provided visually as push messages, which may be displayed over display units of the computing nodes 112-1, 112-2 . . . 112-N. Alternatively, in some implementations, these notifications are provided as voice commands on headsets of the computing nodes 112-1, 112-2 . . . 112-N, which are being used by the workers. Also, in some implementations, the notifications may be simultaneously transmitted as display messages and voice based commands on the display units and headsets respectively of the computing nodes 112-1, 112-2, . . . 112-N.

In accordance with various embodiments described herein, the notifications may be provided in real-time, as in when the workers are working in the material handling environment, for example, processing various items for shipment delivery, packing and unpacking items in a distribution or logistic center etc. The notifications are actionable insights as the workers receive them in real-time, and may view their current productivity metric and take corrective actions, which includes, but not limited to rightful way to position the items for dimensioning, for instance, based on the protocols as described at step 910.

Illustratively, in some embodiments, the notifications may be provided based on identifying errors recorded by the dimensioning system 104 in computing the dimensional data of the at least one item. In this regard, the errors are recorded by the dimensioning system 104 by detecting presence of non-adherence with the protocols to be followed by a worker for positioning the at least one item in the field of view of the dimensioning system. Illustratively, in some example implementations, the errors may be recorded by the dimensioning system 104 based on detection by the range imaging unit 104-1-2, or placement of an item with at least a part of the item touching a boundary of the field of view of the dimensioning system 104-1.

In one embodiment, the actionable insights provided by the productivity metrics system 201 may include instructions for positioning a weighing scale in the field of view of the dimensioning system 104. In this regard, a weighing scale for weighing items may be installed in the field of view of the dimensioning system 104, for instance, along the platform 418. The instructions in this aspect may include positioning the weighing scale in a defined orientation with respect to the item being dimensioned. In some embodiments, the actionable insights provided by the productivity metrics system 201 may include instructions for affixing labels, for example, but not limited to barcodes, RFID tags, etc. on various items which are being processed for shipping.

In an example embodiment, the productivity metrics system 201 may be installed in the material handling environment having multiple equipment like conveyor belts, sorter units, accumulators and/or accumulating zones or singulators along the conveyor belts, palletizers (e.g., robotic arm palletizers or in-line palletizers). etc., which may be used for handling the items and for automatic positioning and orientating the items for shipment processing. Such environments may also include an item identification zone, including encoded information readers, such as, but not limited to, bi-optic scanners, barcode readers, RFID readers, used for scanning product codes etc. on the items. In such environments including the mentioned equipment, the notifications provided by the productivity metrics system 201 including the actionable insights may be in form of instructions or commands to a control unit or a programmable control logic (PLCs) controlling the operations of these equipment. For instance, in some example implementations, a control unit of the palletizer may receive actionable insights for automated positioning of one or more items in a field of view of the dimensioning system 500. In this regard, based on the instructions or the commands, the control unit may automatically initiate positioning of upcoming items for processing in the field of view of the dimensioning system 104.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. A method for providing real-time productivity information to a worker in a material handling environment, the method comprising:
   accessing, by a processing unit, order level data associated with a plurality of items identified for shipping in the material handling environment from a warehouse management system;
   receiving, from a dimensioning system in real-time as at least one item from the plurality of items is being processed for shipping, dimensional data indicative of dimensions of the at least one item, wherein the dimensional data is determined based on processing a plurality of range images of the at least one item when the at least one item is placed in a field of view of the dimensioning system;
   accessing, by the processing unit, worker operation data indicative of information associated with the worker and at least one workflow being operated by the worker;
   computing, by the processing unit, productivity metrics of the worker based on: the order level data, the dimensional data, the worker operation data that includes requirements to handle the at least one item based on a situation associated with the at least one workflow being operated by the worker, and a count of the at least one item identified for shipping, wherein the requirements to handle the at least one item based on the situation are defined based at least on a dimension and a type of the at least one item; and
   providing, by the processing unit, notifications comprising actionable insights indicative of actions to be performed by the worker based on the computed productivity metrics of the worker.

2. The method of claim 1, wherein the dimensional data is determined based on:
   projecting, by a pattern projecting unit of the dimensioning system, a light pattern on the at least one item placed in the field of view of the dimensioning system; and
   capturing, by a range imaging unit of the dimensioning system, the plurality of range images of the at least one item upon detecting the light pattern reflected from the at least one item.

3. The method of claim 1, wherein the dimensional data comprises at least one of:
   volume, dimensional weight, height, or width corresponding to the at least one item.

4. The method of claim 1, wherein the computing of the productivity metrics comprises:
   computing dimensional throughput data based on: (a) the dimensional data including a volumetric dimension of the at least one item and (b) the worker operation data including use-case data associated with the at least one workflow being operated by the worker, wherein the dimensional throughput data is indicative of a delivery throughput of material handling environment with respect to dimensions of the plurality of items being processed for shipping in the material handling environment;
   computing order throughput data based on the count of the at least one item identified for shipping and the worker operation data including the use-case data associated with the at least one workflow being operated by the worker, wherein the order throughput data is indicative of a delivery throughput of the material handling environment per shipping order; and
   computing the productivity metrics based on a weighted average of the computed dimensional throughput data and the computed order throughput data.

5. The method of claim 4, wherein computing the productivity metrics further comprises receiving, from the warehouse management system, inputs indicative of weight for at least one of: the order level data, dimensional data, or the worker operation data.

6. The method of claim 1, wherein the count of the at least one item is determined based on at least one of: scanning, by an encoded information reader, coded information on the at least one item, or detecting, by the dimensioning system, placement of the at least one item in the field of view of the dimensioning system.

7. The method of claim 1, wherein the order level data comprising specifications of a customer order identified for shipping and an association of the at least one item from the plurality of items with the customer order.

8. The method of claim 1, wherein the notifications are indicative of instructions for positioning the at least one item in a pre-defined orientation, in the field of view of the dimensioning system, wherein the pre-defined orientation is based on protocols to be followed by the worker for positioning the at least one item in the field of view of the dimensioning system.

9. The method of claim 8, wherein the protocols for positioning the at least one item to be dimensioned in the field of view of the dimensioning system comprises at least one of: (i) positioning the at least one item at a center of the field of view of the dimensioning system, (ii) positioning the at least one item in the field of view of the dimensioning system with a surface having largest surface area facing a scale of the dimensioning system, (iii) positioning the at least one item with a surface on which labels are affixed facing towards the dimensioning system, (iv) positioning each item from the plurality of items with a pre-defined gap when each of the item is positioned in the field of view of the dimensioning system, or (v) positioning at least one item having cylindrical shape from the plurality of items in a horizontal orientation with respect to a platform on which the at least one item is positioned in the field of view of the dimensioning system.

10. The method of claim 8, wherein the processing unit is to provide the notifications based on identifying errors recorded by the dimensioning system in computing the dimensional data of the at least one item, wherein the errors are recorded by the dimensioning system by detecting presence of non-adherence with the protocols to be followed by the worker for positioning the at least one item in the field of view of the dimensioning system.

11. The method of claim 1, wherein the notifications are provided based on:
   receiving, by the processing unit, range images and point cloud data from the dimensioning system for items handled by plurality of workers operating in the material handling environment;
   computing product orientation, indicative of placement of the items in the field of view of the dimensioning system, based on processing the received range images and point cloud data, wherein the product orientation is computed for each item being handled by the plurality of workers;
   identifying workers from the plurality of workers having a pre-defined productivity metric;
   selecting product orientation corresponding to items handled by the identified workers; and
   providing notifications including instructions for placing the items in the selected product orientations.

12. The method of claim 1, wherein the worker operation data associated with the worker comprises at least one of a duration of employment for the worker, or a designation indicative of a role and responsibility of the worker in the material handling environment.

13. The method of claim 1, wherein the worker operation data associated with the at least one workflow being operated by the worker corresponds to rules comprising one or more of: rules for packaging items based on at least one of an item type, a customer, irregularity in dimensions of the items, rules for creation of labels to be affixed on the items, and rules for packing multiple stock keeping units into one over-pack based on the dimensional data for the items.

14. The method of claim 1, wherein the actionable insights comprises instructions for at least one of positioning a weighing scale in the field of view of the dimensioning system, affixing labels on the plurality of items, or positioning an item from the plurality of items in the field of view of the dimensioning system.

15. A system for providing real-time productivity information to a worker in a material handling environment, the system comprising:
   a dimensioning system comprising:
      a pattern projecting unit configured to project a light pattern on an item placed in a field of view of the dimensioning system;
      a range imaging unit configured to capture one or more range images of the item on receiving the light pattern reflected from the item upon projection of the light pattern on the item;
      a processor, communicatively coupled to the pattern projecting unit and the range imaging unit, wherein the processor is configured to compute dimensional data indicative of dimensions of the item based on processing of the one or more range images;
   a processing unit communicatively coupled to the dimensioning system and a warehouse management system, wherein the processing unit is configured to:
      access, from the warehouse management system, order level data associated with plurality of items identified for shipping in the material handling environment;
      receive, in real-time as the item from the plurality of items is being processed for shipping, the dimensional data from the dimensioning system;

access worker operation data indicative of information associated with the worker and at least one workflow being operated by the worker;

compute productivity metrics of the worker based on: the order level data, the dimensional data, the worker operation data that includes requirements to handle at least one item based on a situation associated with the at least one workflow being operated by the worker, and a count of items handled by the worker, wherein the requirements to handle the at least one item based on the situation are defined based at least on a dimension and a type of the at least one item; and provide notifications comprising actionable insights indicative of actions to be performed by the worker for improving the computed productivity metrics.

16. The system of claim 15, wherein to compute the productivity metrics, the processing unit is to further:

compute dimensional throughput data based on: (a) the dimensional data including a volumetric dimension of at least one item from the plurality of items and (b) the worker operation data including use-case data associated with the at least one workflow being operated by the worker, wherein the dimensional throughput data is indicative of a delivery throughput of material handling environment with respect to dimensions of the plurality of items being processed for shipping in the material handling environment;

compute order throughput data based on the at least one item identified for shipping and the worker operation data including the use-case data associated with the at least one workflow being operated by the worker, wherein the order throughput data is indicative of a delivery throughput of the material handling environment per shipping order; and compute the productivity metrics based on a weighted average of the computed dimensional throughput data and the computed order throughput data.

17. The system of claim 15, wherein to provide the notifications, the processing unit is configured to further:

receive range images and point cloud data from the dimensioning system for items handled by plurality of workers operating in the material handling environment;

compute product orientation, indicative of placement of the items in the field of view of the dimensioning system, based on processing the received range images and point cloud data, wherein the product orientation is computed for each item being handled by the plurality of workers;

identify workers from the plurality of workers having a pre-defined productivity metric;

select product orientation corresponding to items handled by the identified workers; and provide notifications including instructions for placing the items in the selected product orientations.

18. The system of claim 16, wherein the notifications are indicative of instructions for positioning the at least one item in a pre-defined orientation in the field of view of the dimensioning system, wherein the pre-defined orientation is based on protocols to be followed by the worker for positioning the at least one item in the field of view of the dimensioning system.

19. The system of claim 15, wherein the worker operation data associated with the worker comprises at least one of a duration of employment for the worker, or a designation indicative of a role and responsibility of the worker in the material handling environment.

20. An apparatus for providing real-time productivity information to a worker in a material handling environment, the apparatus comprising at least one processor and at least one non-transitory memory including program code, the at least one non-transitory memory and the program code configured to, with the at least one processor, cause the apparatus to at least:

access, from a warehouse management system, order level data associated with plurality of items identified for shipping in the material handling environment;

receiving, in real-time as an item from the plurality of items is being processed for shipping, dimensional data indicative of dimensions of the plurality of items that are being processed for shipping;

access worker operation data indicative of information associated with the worker handling shipping for the plurality of items and at least one workflow being operated by the worker; and compute productivity metrics of the worker based on: the order level data, the dimensional data, the worker operation data that includes requirements to handle at least one item based on a situation associated with the at least one workflow being operated by the worker, and a count of the plurality of items handled by the worker, wherein the requirements to handle the at least one item based on the situation are defined based at least on a dimension and a type of the at least one item.

* * * * *